US006993726B2

(12) United States Patent
Rosenholtz et al.

(10) Patent No.: US 6,993,726 B2
(45) Date of Patent: Jan. 31, 2006

(54) METHODS AND SYSTEMS FOR DOCUMENT NAVIGATION USING ENHANCED THUMBNAILS

(75) Inventors: Ruth E. Rosenholtz, Menlo Park, CA (US); Allison G. Woodruff, Foster City, CA (US); Andrew R. Faulring, Pittsburgh, PA (US)

(73) Assignee: Xerox Corporation, Stamford, CT (US)

( * ) Notice: Subject to any disclaimer, the term of this patent is extended or adjusted under 35 U.S.C. 154(b) by 427 days.

(21) Appl. No.: 09/682,230

(22) Filed: Aug. 8, 2001

(65) Prior Publication Data

US 2003/0030678 A1 Feb. 13, 2003

(51) Int. Cl.
*G09G 5/00* (2006.01)
(52) U.S. Cl. .................. 715/835; 715/838; 715/810
(58) Field of Classification Search ................ 715/835, 715/838, 810, 834, 839; 345/660, 810, 815, 345/835, 838
See application file for complete search history.

(56) References Cited

U.S. PATENT DOCUMENTS

| 5,060,135 | A | | 10/1991 | Levine et al. |
| 5,241,655 | A | * | 8/1993 | Mineki et al. ............ 345/835 |
| 5,384,863 | A | | 1/1995 | Huttenlocher et al. |
| 5,526,443 | A | | 6/1996 | Nakayama |
| 5,689,718 | A | * | 11/1997 | Sakurai et al. ............ 715/517 |
| 5,740,285 | A | | 4/1998 | Bloomberg et al. |
| 5,751,287 | A | * | 5/1998 | Hahn et al. ............... 345/775 |
| 5,819,301 | A | | 10/1998 | Rowe et al. |
| 5,860,074 | A | | 1/1999 | Rowe et al. |
| 5,870,767 | A | | 2/1999 | Kraft |
| 5,917,488 | A | * | 6/1999 | Anderson et al. ......... 345/838 |
| 5,918,238 | A | | 6/1999 | Hayashi |
| 5,960,448 | A | | 9/1999 | Reichek et al. |
| 6,073,148 | A | | 6/2000 | Rowe et al. |
| 6,091,408 | A | * | 7/2000 | Treibitz et al. ............ 345/753 |
| 6,128,634 | A | | 10/2000 | Golovchinsky et al. |
| 6,256,648 | B1 | | 7/2001 | Hill et al. |
| 6,271,840 | B1 | | 8/2001 | Finseth et al. |
| 6,272,484 | B1 | | 8/2001 | Martin et al. |
| 6,275,829 | B1 | | 8/2001 | Angiulo et al. |
| 6,310,633 | B1 | | 10/2001 | Graham |
| D453,938 | S | | 2/2002 | Graham |
| D454,883 | S | | 3/2002 | Graham |
| 6,353,448 | B1 | | 3/2002 | Scarborough et al. |
| 6,356,908 | B1 | * | 3/2002 | Brown et al. ............... 707/10 |
| 6,369,811 | B1 | | 4/2002 | Graham et al. |
| 6,405,192 | B1 | * | 6/2002 | Brown et al. ............... 707/3 |
| 6,427,155 | B1 | | 7/2002 | Ishimaru |

(Continued)

OTHER PUBLICATIONS

Erick, S. G., Steffen, J.L., and Sumner, E.E. "Seesoft—A Tool For Visualizing Line Oriented Software Statics," *IEEE Transactions On Software Engineering* vol. 18, No. 11, Nov. 1992.

(Continued)

*Primary Examiner*—Raymond J. Bayerl
*Assistant Examiner*—Ting Zhou
(74) *Attorney, Agent, or Firm*—Oliff & Berridge, PLC

(57) ABSTRACT

A thumbnail image includes at least one selectable element. The selectable element may be selected, or the document as a whole may be selected. The selectable element is associated with either (a) a portion of the original document, smaller than the original document as a whole or (b) a document other than the original document. When the thumbnail as a whole is selected, the original document is displayed. When the selectable element is selected, the appropriate portion of the original document, or the document other than the original document, is displayed.

18 Claims, 26 Drawing Sheets

U.S. PATENT DOCUMENTS

| | | | |
|---|---|---|---|
| 6,613,100 | B2 | 9/2003 | Miller |
| 6,665,838 | B1 | 12/2003 | Brown et al. |
| 6,690,843 | B1 * | 2/2004 | Squilla et al. ............. 382/306 |
| 6,708,309 | B1 | 3/2004 | Blumberg |
| 2002/0111974 | A1 | 8/2002 | Dutta et al. |
| 2002/0124026 | A1 | 9/2002 | Weber |
| 2002/0143825 | A1 | 10/2002 | Feinberg |
| 2002/0191031 | A1 * | 12/2002 | Ricard ....................... 345/838 |

OTHER PUBLICATIONS

Ogden, W.C., Davis, M. W., and Rice, S. *Document thumbnail visuali zations for rapid relevance judgments: When do they pay off?* TREC 1998, pp. 528-534.

U.S. Appl. No. 09/682,231, filed Aug. 8, 2001.

U.S. Appl. No. 09/682,229, filed Aug. 8, 2001.

U.S. Appl. No. 09/682,232, filed Aug. 8, 2001.

Ayers, E. and Stasko, J. "Using Graphic History in Browsing the World Wide Web", *Proc. $4^{th}$ Intl. WWW Conf.*, Boston, Dec. 1995.

Hightower, R., Ring, L., Helfman, J., Bederson, B., and Hollan, J. Graphical Multiscale Web Histories: A Study Of BadPrints, *Proc. Hypertext '98*, 1998, pp. 58-65.

Kopetzky, T. and Mühlhäuser, M. "Visiual Preview for Link Traversal on the WWW," *Proc. $8^{th}$ Intl. WWW Conference*, Toronto, Canada, May 1999, pp. 447-454.

Cockburn, A., et al. "Web View: A Graphical Aid for Revisiting Web Pages," *Proc. OZCHI '99 Australian Conf. On HCI*, Wagga Wagga, Australia, Nov. 1999.

Wynblatt, M. and Benson, D. "Web Page Caricatures: Multimedia Summaries for WWW Documents," *Proc. IEEE Intl. Conf. On Multimedia Computing and Systems*, Austin, TX, Jun., 1998, pp. 194-199.

Olston, C. and Chi, E. "Scent Trails: Integrating Browsing and Searching on the World Wide Web," *Submitted to SIGCHI 2001*.

Card, S. K., Mackinlay, J.D., and Shneiderman, B. "Information Visualization: Using Vision to Think," Morgan-Kaufmann, San Francisco, 1998, pp. 306-309, 311, 331-332, 341-342, 381.

Hearst, M., "Title Bars: Visualization of Term Distribution Information in Full Text Information Access," *Proceedings Of CHI '95, ACM Conference on Human Factors in Computing Systems*, pp. 59-66.

Helfman, J.I. "Mandala: An Architecture for Using Images to Access and Organize Web Information," *Proceedings of Visual '99, Visual Information and Information Systems, Third International Conference*, 1999, pp. 163-170.

Boguraev, B., Kennedy, C. Bellamy, R., Brawer, S. Wong, Y.Y., Swartz, J. "Dynamic Presentation of Document Content For Rapid On-Line Skimming," *AAAI Spring 1998 Symposium on Intelligent Text Summarization*, Stanford U, 1998.

Graham, J. "The Reader's Helper," *Proceeding of the CHI 99 Conference on Human Factors in Computing Systems: The CHI is the limit*, May 1999.

Chiou, T. et al. "Perceptual Thumbnail", http://www.media.mit.edu/~dc/research/thumbnail/chi98.htm/, Mar. 1999.

Thomas Erickson et al.; *Social Translucence: An Approach to Designing Systems that Support Social Processes*; ACM Transactions on Computer-Human Interaction, vol. 7, No. 1, Mar. 2000, pp. 59-83.

U.S. Appl. No. 09/682,229, filed Aug. 2001, Rosenholtz.

U.S. Appl. No. 09/682,232, filed Aug. 2001, Rosenholtz.

D. Byrd, "A Scrollbar-based Visualization for Document Navigation," Univ of Mass., 1999, background material.

U. Manbar, "The Use of Customized Emphasis in Text Visualization," Univ. of AZ, 1997 IEEE, background material.

K. Hirata et al., "Object-oriented Navigation: An intuitive Navigation Style for Content-oriented Integration Environment," 1997, ACM, background material.

S. Bjork et al., "WEST: A Web Browser for Small Terminals," UIST '99, 1999 ACM.

Bjork et al., "An Alternative to Scrollbars on Small Screens," Viktoria Institute, Sweden, copyright unknown, background Material.

K. Kaugars, "Integrated Multi Scale Text Retrieval Visualization," NM State, 1998, ACM, background material.

S. Greenberg et al., "Awareness Through Fisheye Views in Relaxed-WYSIWIS Groupware," 1996 Morgan-Kaufmann, Background material.

"The Design of a Wearable Computer," CHI '97, 1997.

* cited by examiner

METHODS AND SYSTEMS FOR DOCUMENT NAVIGATION USING ENHANCED THUMBNAILS

RELATED APPLICATIONS

This non-provisional application is related to co-pending non-provisional applications by the same inventors, entitled "METHODS AND SYSTEMS FOR GENERATING ENHANCED THUMBNAILS", "METHODS AND SYSTEMS FOR TRANSITITIONING BETWEEN THUMBNAILS AND DOCUMENTS BASED UPON THUMBNAIL APPEARANCE" and "METHODS AND SYSTEMS FOR GENERATING ENHANCED THUMBNAILS USABLE FOR DOCUMENT NAVIGATION", all filed on even date herewith and identified by U.S. patent application Ser. Nos. 09/682,229, 09/682,231 and 09/682,232 (now U.S. Pat. No. 6,883,138), respectively.

BACKGROUND OF THE INVENTION

1. Field of Invention

This invention relates to a method and systems for document navigation using enhanced thumbnails.

2. Description of Related Art

Computer users spend a significant amount of time examining collections of documents, such as documents retrieved by a search engine from the Internet. The user must page through lists of documents, briefly evaluating each for possible relevance to a particular information need. Improving the efficiency of this tedious process would directly benefit the end-user and, by improving end-user satisfaction, would indirectly benefit parties such as the search engine vendor.

For instance, the Internet search engine can increase user efficiency by (1) returning higher-quality document lists (e.g., through better index coverage and ranking algorithms) or by (2) providing information that allows the user to evaluate the results more quickly and accurately. Search engine vendors attack both problems. The standard practice with regard to approach (2) is to provide brief textual summaries of the Web documents. In recent years, in addition to textual summaries of documents, it has been suggested that graphical summaries of the documents, such as thumbnail images, can greatly increase the efficiency by which end-users process search engine result sets.

Each of these approaches has advantages and disadvantages. For example, text summaries are terse but are verbal rather than visual. They require little storage space and can therefore be downloaded quickly. Additionally, text summaries often contain a great deal of valuable information about each document. For example, search engines commonly provide the document's URL, header, size, and a few phrases or sentences that either summarize the document or emphasize some of the search keywords. On the other hand, text summaries do not provide much information about the page layout or any image contained in the page. Furthermore, the user must read the text summary, which is time consuming and tiring.

In contrast, graphical summaries do provide information about the layout, genre, and style of the page. If the user has previously seen the page, or one like it, the visual representation may aid in recognizing or classifying it. This becomes even more compelling in view of the fact that the human visual system can process images more quickly than text. Graphical information can speed many tasks tremendously. However, thumbnails typically require more storage space than text summaries, and therefore, they generally download more slowly than text summaries. Further, textual content in plain thumbnails is less accessible than that in text summaries, as it is difficult to read and is not conveniently summarized.

Previous work includes several different designs for thumbnails. A number of programs generate plain thumbnails. These include many graphical editors, recent versions of Microsoft Windows, and systems described by Hightower et al. (Hightower, R., Ring, L., Helfman, J., Bederson, B., & Hollan, J. (1998), Graphical Multiscale Web Histories: A Study of PadPrints, Proceedings of Hypertext '98, 58–65), among others. Thumbnails of Ayers et al. (Ayers, E., & Stasko, J. (1995), Using Graphic History in Browsing the World Wide Web, Proceedings of the 4th International World Wide Web Conference) are similar to plain thumbnails, showing a reduced view of the upper left corner of a document.

Other programs generate more complex thumbnails. Cockburn et al. (Cockburn, A., Greenberg, S., McKenzie, B., Jasonsmith, M., & Kaasten, S. (1999), WebView: A Graphical Aid for Revisiting Web Pages, Proceedings of OZCHI'99, Australian Conference on Human Computer Interaction) generate thumbnails that show reduced images plus dogears that indicate bookmarked and frequently visited pages. Helfman (Helfman, J. I. (1999), Mandala: An Architecture for Using Images to Access and Organize Web Information, Proceedings of Visual '99, Visual Information and Information Systems, Third International Conference, 163–170) selects representative images from a document and creates reduced scale images of these to serve as a thumbnail for that document. Wynblatt et al. (Web Page Caricatures: Multimedia Summaries for WWW Documents; IEEE; 1998) produce Web page caricatures. These caricatures contain select features of a page, often rendered in an abstract form, such as the header, a representative image, the number of images, an abstract, etc. However, these caricatures do not preserve layout and lack some of the visual information that might be naturally available in a reduced scale image of the page. For example, rather than having the user judge link density, or the number of links on a Web page from an image of the page, this link density is represented by the background color of the caricature.

SUMMARY OF THE INVENTION

The systems and methods according to this invention use thumbnails with selectable elements that allow a user to directly view a part of an original document or another document associated with the selectable elements.

In embodiments, the invention includes displaying a thumbnail having at least one first selectable element, the thumbnail as a whole being associated with an original document and the at least one first selectable element being associated with either (a) a portion of the original document, smaller than the original document as a whole, or (b) a document other than the original document. A selection of either (a) the thumbnail as a whole or (b) the at least one first selectable element is received. Based on the selection, the original document, the portion of the original document, or the document other than the original document is displayed.

In embodiments, the invention includes displaying a thumbnail associated with an original document and having at least one first selectable elements, each selectable element having, as an associated destination, one of (a) an arbitrary portion of the original document accessible by selection of a second selectable element provided in the original document and (b) a document other than the original document. A selection of one of the first selectable elements is received, and the associated destination is directly accessed based on the selection.

In embodiments, the invention includes displaying an enhanced thumbnail associated with an original document and having at least one first selectable element, the enhanced thumbnail having at least one element with a modified appearance relative to an appearance of a corresponding element in the original document, each at least one first selectable element having, as an associated destination, a portion of the original document, smaller than the original document and not uniquely associated with any selectable element provided in the original document. A selection of one of the first selectable elements is received, and the associated destination is directly accessed based on the selection.

These and other objects, advantages and salient features of the invention are described in or apparent from the following description of exemplary embodiments.

BRIEF DESCRIPTION OF THE DRAWINGS

The invention is described in detail with regard to the following figures, wherein like numbers reference like elements, and wherein.

DETAILED DESCRIPTION OF THE PREFERRED EMBODIMENT

Enhanced thumbnails according to this invention increase user efficiency by allowing the user to grasp document content without having to view the entire document. This is done by modifying the appearance of one or more features of the thumbnail image such that the resulting thumbnail provides better cues to aid the user in identifying or classifying the underlying document.

As used herein, "thumbnail" typically refers to a reduced-size image associated with a document or other electronic data, but may also refer to any reduced-size representation that at least partially preserves a page layout of an original document, and may encompass any reduced-size representation of a document or other electronic data. For example, the reduced-size representation may be an image generated based on the document, or may be a reduced version of the document that retains a document format of the document, or may be a hybrid representation including both image characteristics and document format characteristics.

Figure 1:
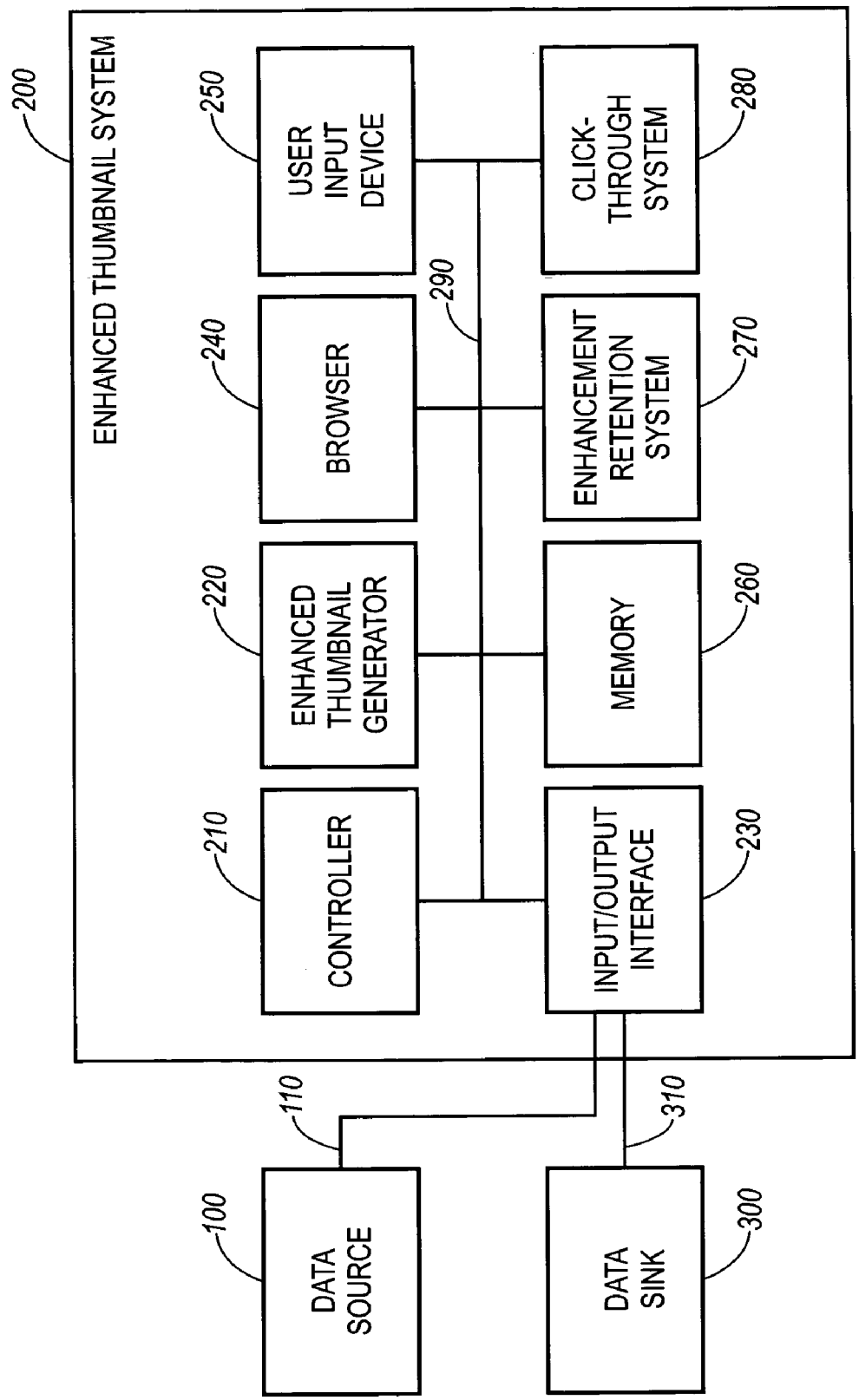
FIG. 1 is a block diagram showing an exemplary embodiment of an enhanced thumbnail generating system.

FIG. 1 shows a diagram of one exemplary embodiment of an enhanced thumbnail generating system according to this invention. As shown in FIG. 1, a data source 100 and a data sink 300 are connected to an enhanced thumbnail system 200 over links 110 and 310, respectively. The data source 100 can be a locally or remotely located computer, a scanner, or any other known or later developed device that is capable of generating data, such as documents. The data source 100 may also be a data carrier, such as a magnetic storage disk, CD-ROM or the like. Similarly, the data source 100 can be any suitable device that stores and/or transmits electronic document data, such as a client or a server of a network, or the Internet, and especially the World Wide Web, and news groups. The link 110 can be any known or later developed device or system for connecting the data source 100 to the enhanced thumbnail generator 200, including a direct cable connection, a connection over a wide area network or local area network, a connection over an intranet, a connection over the Internet, or a connection over any other distributed processing network or system.

It should also be appreciated that the document data may be a scanned image of a physical document or a photograph, or a document typed electronically using any software, such as word processing software, or a document created using any known programming language or software. The document may also be the contents of an application window on a user's desktop, e.g., the toolbars, window decorations, and spreadsheet shown in a spreadsheet program. The data source 100 is thus any known or later developed device which is capable of supplying electronic data over the link 110 to the enhanced thumbnail system 200. The link 110 can thus be any known or later developed system or device for transmitting the electronic data from the data source 100 to the enhanced thumbnail system 200.

The data sink 300 can be any device that is capable of outputting or storing the process image data generated according to the system and methods according to this invention, such as a printer, a copier or other image forming device, a facsimile device, a display device, a memory, or the like. In preferred embodiments, the data sink is a display device, such as a computer monitor or the like. The link 310 can be any known or later developed device or system for connecting the data sink 300 to the enhanced thumbnail system 200, including a direct cable connection, a connection over a wide area network or local area network, a connection over an intranet, a connection over the internet, or a connection over any other distributed processing network or system.

As shown in FIG. 1, the enhanced thumbnail system 200 includes a controller 210, an enhanced thumbnail generator 220, an input/output interface 230, a browser 240, a user input device 250, a memory 260, an enhancement retention system 270 and a click-through system 280, all of which are interconnected via a bus 290.

The controller 210 controls the operation of other components of the enhanced thumbnail generator 200, performs any necessary calculations and executes any necessary programs for generating enhanced thumbnails, and controls the flow of data between other components of the enhanced thumbnail generator 200 as needed. The enhanced thumbnail generator 220 generates enhanced thumbnails, as described in detail below.

The enhanced thumbnail generator 200 may implement a program written in any suitable programming language and may utilize a component Web browser. For example, a generator which is a program written in the Java programming language and utilizes a component browser 240, such as the ICE Browser, made by WindRiver, is suitable for use in the enhanced thumbnail generating system 200. The browser 240 provides access to documents when documents are to be retrieved from a distributed database, such as the Internet. The browser 240, such as the ICE browser, may also provide a rendered version of the document. That is, the browser 240 could also provide a full-size or thumbnail image of the document in accordance with the document format and the important element or elements to be extracted.

The input/output interface 230 is an interface for the data source 100 and data sink 300 which are connected via the links 110 and 310, respectively.

The user input device 250 is an input device that allows the user to enter information for requesting document retrievals, database searches, or the like. For example, the user input device 250 may be or include a keyboard, mouse, touch screen panel, voice recognition/based input device and/or the like.

The memory 260 may serve as a buffer for information coming into or going out of the enhanced thumbnail generator 200, may store any necessary programs and/or data for implementing the functions of the enhanced thumbnail generator 200, and/or may store data and/or enhanced thumbnails at various stages of processing.

The enhancement retention system 270 may be provided for display of a document version that is more similar to the thumbnail than the original document for which the thumbnail was generated. For example, the enhancement retention system 270 may retain modified versions of document elements that have been modified from the original document version during generation of a thumbnail, or otherwise retain appearance characteristics of a thumbnail that are different from corresponding appearance characteristics in the original document. Therefore, when a user requests display of a document corresponding to the thumbnail, a document version may be displayed that has appearance characteristics similar to those of the thumbnail. This helps the user to quickly locate the elements as they appeared in the thumbnail. If desired, the enhancement retention system 270 returns the modified elements back to the original format after a predetermined period of time has elapsed or when instructed by the user via the user input device 250. The return to the original format may be direct. Alternatively, the return may be in stages. For example, one or more intermediate versions of the document, each successively closer to the original document in appearance, may be displayed. It is also possible to stop at one of these intermediate versions, never going to the original document.

The click-through system 280 may be provided to allow a user to directly view a document or document portion associated with a selectable element in the thumbnail, without first viewing the original document associated with the thumbnail. The click-through system 280 allows the user to jump to a part of a document corresponding to a thumbnail, or to another document associated with a selectable element of the original document associated with the thumbnail, by clicking a selectable element on the thumbnail. That is, if the user selects a selectable element of the thumbnail by, for example positioning a cursor on the selectable element with a mouse and clicking or double-clicking a specified mouse button, the click-through system 280 causes a part of the original document corresponding to the clicked selectable element to be directly displayed, without first displaying the first page or screen of the original document. In addition, if the thumbnail contains a selectable element that is a hyperlink to another document, the click-through system 280 causes the hyperlinked document to be directly displayed without first displaying the original document.

If desired, the thumbnail may be displayed concurrently with a document. For example, if a document is retrieved by "clicking through" the thumbnail, the thumbnail (or a different thumbnail) may be displayed concurrently with the document, thus allowing the user to "click through" to another document or to another portion of the currently displayed document. Furthermore, it should be appreciated that the click-through feature may be combined with the above-described enhancement retention feature. For example, a document retrieved by the click-through procedure may be displayed with modifications similar to modifications present in the thumbnail.

In FIG. 1, alterable portions of the memory 260 are, in various exemplary embodiments, implemented using static or dynamic RAM. However, the memory 260 can also be implemented using a floppy disk and disk drive, a writeable optical disk and disk drive, a hard drive, flash memory or the like. In FIG. 1, the generally static portions of the memory 260 are, in various exemplary embodiments, implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

Figure 2:
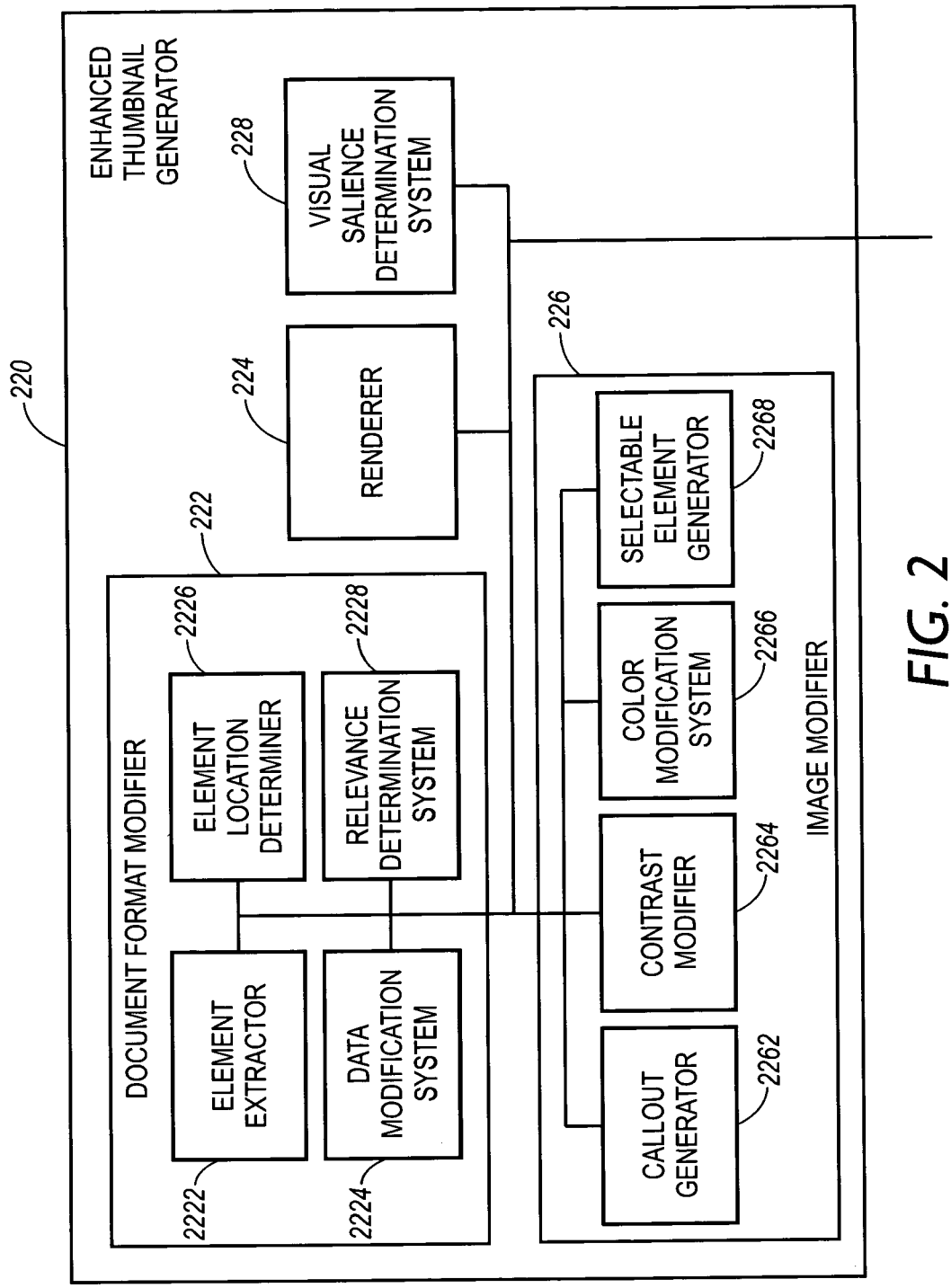
FIG. 2 is a block diagram showing one exemplary embodiment of an enhanced thumbnail generator in the enhanced thumbnail generating system of FIG. 1.

As shown in FIG. 2, the enhanced thumbnail generator 220 may include a document format modifier 222, a renderer 224, an image modifier 226, and a visual salience determination system 228. The document format modifier 222 modifies a format of the original document, e.g., a page layout of the original document, font sizes used in the original document, colors used in the original document, and/or the like. The document format modifier 222 includes an element extractor 2222 that extracts important document elements, i.e., elements that are useful in identifying, classifying and/or characterizing the documents. For example, important document elements may be or include a document header, words that match keywords input by a search request, words or other information associated with tags, and/or elements indicated to be relevant by a relevance determination system 2228 as discussed in more detail below.

The document format modifier 222 also includes a data modification system 2224 that modifies document data.

Typically, the document data to be modified includes one or more elements extracted by the element extractor 2222, although other elements may also or instead be modified. The modification may include changing the size, color, and/or font of the extracted elements. Furthermore, the document format modifier 222 may include an element location determiner 2226 that determines and stores information related to the position of the element relative to the document layout as a whole or relative to another element within the document extracted by the element extractor 2222.

The relevance determination system 2228 may be provided in the document format modifier 222 to evaluate relevance of elements using known or later developed techniques. For example, the relevance determination system 2228 may identify elements matching keywords input by the user to be more relevant than words that do not match input keywords, and elements near these elements matching keywords as more relevant than elements not near elements matching keywordsAs another example, the relevance determination system 2228 may include or have access to a user profile that indicates a particular user's interests, and then use the information in this user profile to identify elements that are most likely, and/or least likely, to be of interest to the user. As yet another example, the relevance determination system 2228 may rely on any known or later developed visual attention models to predict which elements in a document are likely to draw the attention of a user, or may rely on direct observation of the user through mechanisms such as logging of the user's actions in the browser or monitoring of the user's eye movements with an eyetracking machine. As a further example, the relevance determination system 2228 may consider the size or color of the elements in the original document. The relevance determination system 2228 may analyze each element in a document, or may analyze elements extracted by the element extractor 2222, for example.

The elements identified as relevant by the relevance determination system 2228 may be output as a simple list, or may be output as an ordered list that is prioritized from least-to-most relevant or vice versa, for example. For example, the relevance determination system 2228 may determine a relevance value of each relevant element. The relative relevance of a given element could then be determined by comparison with the relevance value of other relevant elements. It should be appreciated that the relevance determination system may perform a number of different computations of relevance based on different criteria and then combine these into a single relevance value for each element, or into a single ordered list.

The renderer 224 determines the layout of the document if necessary. For example, HTML documents typically require interpretation to determine their layout. The renderer 224 renders a reduced-size representation of the document using any known or later developed image reduction or scaling algorithm. Such scaling might involve simple reduction of the page. It might also involve changes in the aspect ratio of the page, e.g. an entire or a part of the reduced-size representation of the document might be scaled more in the horizontal dimension than in the vertical dimension, or vice versa. Furthermore, the page might be reduced according to distortion-oriented techniques such as fisheye views. These distortions could be based on important elements or on the result of the relevance determination described above; for example, important elements in the document could be proportionally larger than elements not identified as being important or relevant elements of the document.

The image modifier 226 modifies properties of the image output by the renderer 224, and may include a callout generator 2262 that generates callouts (described in more detail below), a contrast reducer 2264 that adjusts the contrast of the thumbnail and/or a color modification system 2266 that adjusts the color of the thumbnail. The image modifier 226 may also include a selectable element generator 2268 that generates selectable elements in the thumbnail image. The selectable elements may correspond to selectable elements that were present in the original document, such as hyperlinks to other documents or to other portions of the same document, or to graphics or the like which, when selected by "double-clicking" or the like, are displayed as in an enlarged format. Alternatively or additionally, the selectable element generator 2268 may generate selectable elements corresponding to different portions of the original document. For example, if a document includes a plurality of pages, a plurality of selectable elements may be generated for placement on the thumbnail image such that, when one selectable element is selected, a corresponding page or area of the original document is displayed. The selectable elements may, rather than being visibly discrete elements, simply be different areas of the thumbnail. In this case, each different area may be associated with a positionally corresponding area of the document. For example, selecting near the top of the thumbnail would retrieve the first page of the document, selecting near the middle of the thumbnail would retrieve an intermediate page of the document, and so forth. It should be appreciated that a page may not only correspond to a physical page in a document, but may also represent the contents of a given window, e.g., the contents of a browser or some other application such as a spreadsheet.

The selectable element generator 2268 may, if necessary, generate proportionally large versions of the selectable elements that were present in the original document so that the thumbnail image versions of the selectable elements are visually distinguishable.

The visual salience determination system 228 determines how to modify the appearance of elements to achieve certain effects related to the user's visual attention to the document, for example to optimize their ability to grab attention. Such a determination may be based on simple rules, such as a rule directing a change in font size to 36-point font for all relevant elements, a rule to enlarge all relevant elements to three times their present size, or the like. Such determinations may also include preserving the appearance of horizontal and vertical lines, or emphasizing decorations or structure in the original document, e.g., ensuring that bold elements in the original document look bold in the thumbnail, or emphasizing the lines in tables. The visual salience determination system 228 may operate in conjunction with the relevance determination system 2228 to determine different modifications for different elements within a document, based on their relative relevance. For example, the most relevant elements in the document may be enlarged more than less relevant elements, and/or may be highlighted with different highlight colors. For example, if red is considered a more attention-grabbing highlight color than yellow, the more relevant elements may be highlighted in red while less relevant elements are highlighted in yellow. Such color choices may be based on pre-chosen metrics, or can be dynamically computed based on the color contents of a given document or set of documents, e.g., the visual salience determination system 228 may choose colors with maximum contrast to those found in a given document or set of documents. It should be appreciated that colors may be chosen based on or influenced by criteria other than visual salience. As an example, colors of different callouts may be assigned based on the semantic-relatedness of the words they contain; words that are related semantically can be assigned similar colors, and words that are not related semantically can be assigned different colors. The visual salience determination system 228 and/or the relevance determination system 2228 may use information from the renderer 224, if necessary, to implement their respective functions. It will be appreciated by those skilled in the art that there are many different criteria that can be used, and various modifications or combinations of modifications that may be implemented, by the visual salience determination system 228.

It should be understood by one of ordinary skill in the art that each of the elements shown in FIGS. 1 and 2 can be implemented as portions of a suitably programmed general purpose computer. Alternatively, each of the circuits shown in FIGS. 1 and 2 can be implemented as physically distinct hardware circuits within an ASIC, or using a FPGA, a PDL, a PLA or a PAL, or using discrete logic elements or discrete circuit elements. Furthermore, it should be appreciated that any number of the discrete elements shown in FIGS. 1 and 2 may be combined into a single entity, and that any element shown as a single entity may be implemented by a plurality of separate elements. For example, one logical combination is for the browser 240 to implement the function of the element location determiner 2226. The particular form each of the elements shown in FIGS. 1 and 2 will take is a design choice and will be obvious and predictable to those skilled in the art. Furthermore, it should be appreciated that, in embodiments, one or more of the above-described elements may be omitted. For example, when a click-through feature is not necessary or desired, the click-through system 280 may be omitted; when the enhancement retention feature is not necessary or desired, the enhancement retention system 270 may be omitted; if relevance determinations are not necessary, the relevance determination system 2228 may be omitted, etc.

As an example of an operation of the above-described system, a user requests document retrieval via the user input device 250. The request may indicate particular documents, such as particular documents stored in a database, e.g., a computer hard drive, network server, email program, or the like. The request may indicate a location of a particular document on the Internet, for example, such as a Uniform Resource Locator (URL), or may specify search parameters, such as one or more key-words or phrases relating to the content for which the user is particularly searching. The request may be a request to any known or later developed search engine to search for documents containing key words or phrases specified by the user. The controller 210 receives the request from the user via the bus 270. If necessary, the controller 210 translates the user request into a command for a search engine, such as a command in the Structured Query Language (SQL), or an HTTP GETrequest. Document information is then retrieved from the data source 100 over the link 110, via the input/output interface 230, in accordance with the request.

The retrieved document information is input to the enhanced thumbnail generator 200. The document information is made accessible to the document format modifier 222 in the enhanced thumbnail generating system 220.

The element extractor 2222 of the document format modifier 222 reads information of each document sent from the data source 100 and identifies and extracts important elements in the document, such as the header of the document, key words, and/or words or features associated with certain tags. For example, if the document is written in Hypertext Markup Language (HTML), <H1> and <H2> tags, which specify the size of text enclosed by the tags, may be considered important elements. It should be appreciated that the extracted elements can be metadata for the document, such as the URL of an HTML document. Before, after or during the extraction, or as part of the extraction, the relevance determination system 2228 may evaluate and indicate relevance of an element, either as an absolute measure of relevance or in terms of relevance relative to other elements.

In addition, the creator of the document may have tagged certain elements of the document as important elements. For example, the document creator may consider certain words or other elements of the document to be particularly important, and may wish to ensure that these elements appear in a subsequently created enhanced thumbnail image. Thus, the document creator may associate the important words or other elements with tags that will be recognized by the element extractor 2222.

The data modification system 2224 in the document format modifier 222 may then modify the document to adjust the important elements identified by the element extractor 2222, and/or other elements, such that the elements will have a modified visual appearance. As described earlier, this visual appearance may be specified by the user, or determined by any known or later developed method. The visual salience determination system 228 may send information regarding the user-specified visual appearance to the data modification system 2224.

For example, the data modification system 2224 may modify key words and/or words that appear in the header by enlarging the words so that, when they are subsequently reduced for placement in a thumbnail, they will still be readable. Modifications may also include changing the color and/or the font type of text and other elements. Such size, color and/or font type changes may be specified by the user or preset in the enhanced thumbnail generator 200.

Moreover, such sizes, color and/or font type may be changed based on the relevance of the important elements determined by the relevance determination system 2228. For instance, more relevant elements may be modified such that they appear larger and/or in different colors of highlighting than less relevant elements.

The element location determiner 2226 may determine the location of the extracted words or elements, and/or of one or more non-extracted elements. This location information may be stored in the memory 260 and may, for example indicate an X-Y coordinate in the document. On the other hand, for certain types of documents, such as documents written in HTML, the appearance of the document may vary depending on the system used to view the document, or the assumed size and aspect ratio of the window that might display the document. In this case, the element location determiner 2226 may determine an X-Y coordinate of the element with respect to the appearance of the document in that system. The location information may be used by the image modifier 226, as described in more detail below.

The renderer 224 then renders a reduced representation of the modified document. For example, the document may be reduced to a 200 pixel×200 pixel image. The reduced-size representation may be an image of the first page of the document or any specified view within the document. The reduced-size representation may be rendered using any of a number of known or later developed methods for creating a reduced-size representation, or may be rendered in a distorted manner as described above.

The image modifier 226 may then modify properties of the reduced-size representation. The image modifier 226 may implement one or more transformations that are not expressed in the original document.

The image modifier 226 may use information obtained by the document format modifier 222, such as identifications of important elements and/or the location of one or more elements. For example, a keyword that has been identified by the element extractor 2222 of the document format modifier 222 and the position of the keyword that is determined by the element location determiner 2226 may be the basis for a transformation by the image modifier 226. Alternatively, the image modifier 226 may independently identify elements or characteristics to modify. For example, the image modifier 226 may modify contrast or color of the image independent of any information obtained by the document format modifier 222.

Figure 4:
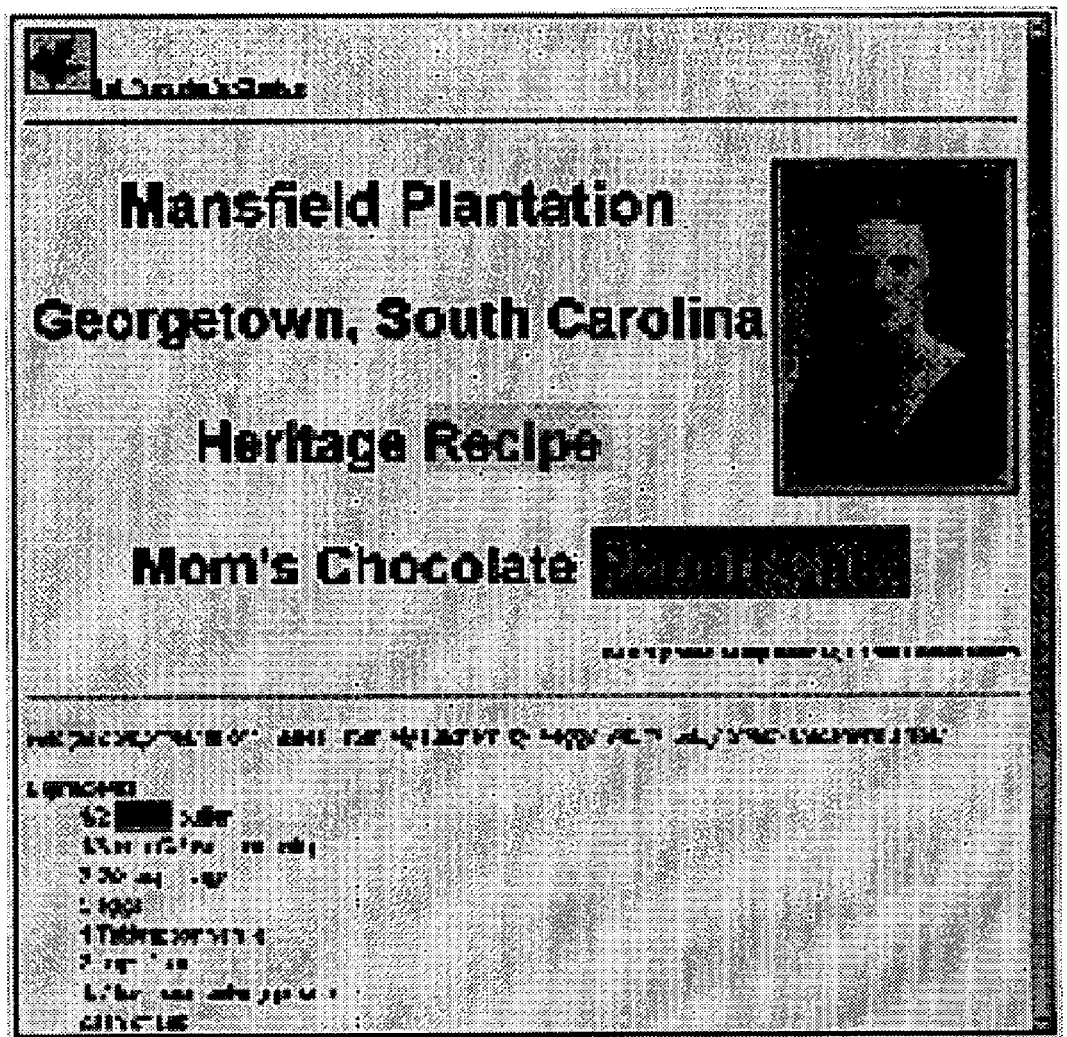
FIG. 4 show an exemplary thumbnail enhanced with a document format modification.
Figure 5:
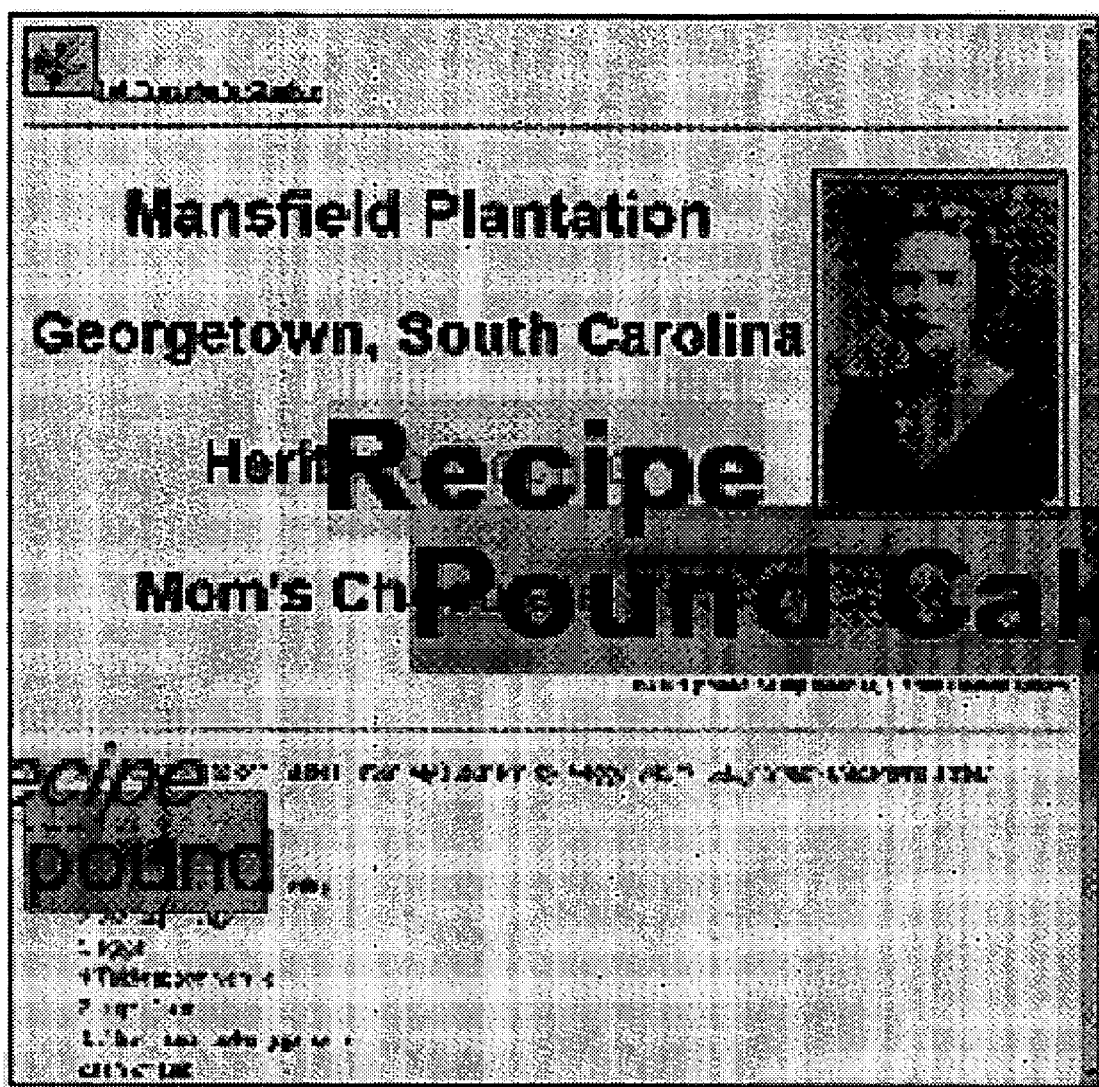
FIG. 5 shows an exemplary thumbnail enhanced with document format and image modifications.
Figure 25:
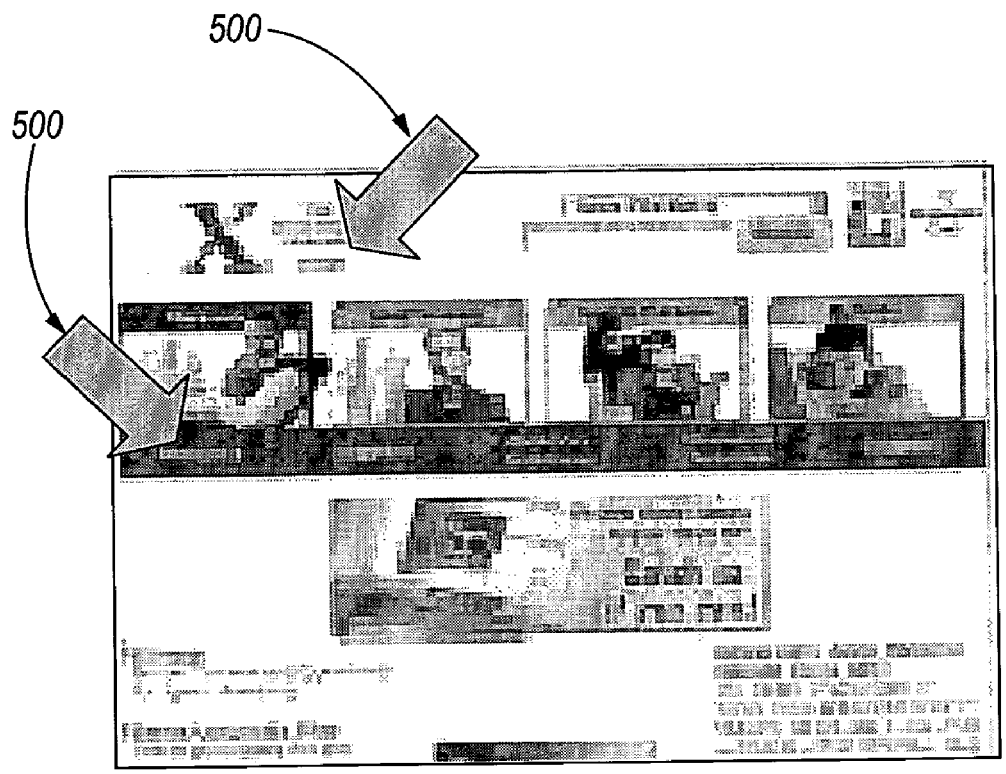

One useful transformation is to render text phrases as callouts, which are enlarged text overlays, on top of or next to the reduced-size representation. In this technique, the callout generator 2262 identifies a word or word phrase, a scale factor at which to re-render the word or word phrase, and optionally an alignment parameter, based on the information from the element location determiner for positioning the callout relative to the original position of the word or word phrase of the document. The callout generator 2262 generates, for example, an enlarged version of the word or word phrase and graphically overlays the enlarged version of the word or word phrase on top of the thumbnail, thus allowing the user to more easily recognize the specified word, words or phrases in the thumbnail. It should be appreciated that a callout generated by the callout generator 2262 may have a different appearance than, for example, a word that has been modified by the data modification system 2224 of the document format modifier 222. An example of this difference can be seen in FIGS. 4 and 5. FIG. 4 shows a thumbnail in which the words in the header have been enlarged by the data modification system 2224. In contrast, FIG. 5 shows an example of the thumbnail in which, along with the modification by the data modification system 2224, a callout has also been generated and overlaid by the callout generator 2262. Specifically, the words "recipe" and "pound cake" have been overlaid as callouts in FIG. 5. It should also be appreciated that the text (or other elements) may either have the same properties as in the original document, or some or all different properties, e.g., color or font may be changed. Further, image transformations can be applied to these elements, e.g., text can be made blurry or shown in perspective, as in FIGS. 22–23. A callout may be an element that does not bear any resemblance to an element with which it is associated. For example, as shown in FIG. 25, callouts may be in the form of arrows overlaid on or near the thumbnail to draw attention to another element.

Other transformations are also possible. For example, a color wash may be applied. A color wash is any change in color applied throughout the image, e.g. through the overlay of a transparent layer on the image such that the original image remains visible but the color of the image as a whole has been modified by the color of the overlay. A color wash is useful as described below. The more saturated the color of an element relative to the surrounding colors, the more it tends to draw attention. The contrast modifier 2264 may change the contrast of the reduced-size representation by applying a white color wash such that the reduced-size representation is made more white, or desaturated. This technique makes the callouts overlaid by the callout generator 2262 stand out better and better draw the user's attention.

As another example, the color of the reduced-size representation may be modified by the color modification system 2266 and/or the data modification system 2224. For example, the color of certain words or other elements, or the entire area or some areas of the reduced-size representation, may be changed so that the overall appearance of the image may be different from that of other thumbnails to better catch the attention of the user. For instance, based on the relevance elements determined by the relevance determination system 2228, if there is a high frequency of the words or phrases specified by the user in the document, a light pink color wash might be applied to the thumbnail, indicating to the user that the document may be highly related to the subject matter the user is interested in.

Color choice may be predefined, possibly based on user preference. Alternatively, color choice may be dynamically determined based on the color content of a document or a given set of documents, e.g., to select colors with maximum contrast to pre-existing colors in the document or set of documents.

Another effective way to draw attention to elements is to put them in a separate visual layer. When elements are in a separate visual layer from the original document, they stand out, thereby drawing the user's attention. Further, the user can selectively attend to the different layers.

For instance, alpha-blending the overlay highlight color of the callouts with the background—i.e., mixing the background image with the overlay highlight color such that the result is a combination of the two, with the alpha value determining the weighting of the combination—creates a semi-transparent overlay, occludes less of the page and in addition provides a strong cue that the callouts are additions to the pages. It should be appreciated that different parts of the callout may or may not be semi-transparent, e.g., in a given callout, text may be non-transparent while the overlay highlight color is semi-transparent.

One standard method of alpha-blending creates a new image ($C_{new}$) from a background image ($C_{old}$) and an overlay image (Overlay) by using the following equation:

$$C_{new}(x,y) = \alpha \, \text{Overlay}(x,y) + (1-\alpha) C_{old}(x,y)$$

For example, if the alpha value ($\alpha$) is 0.4, the resulting image is a mixture of 40% of the overlay highlight color with 60% of the background image. alpha values of around 0.5 are preferable for the overlay highlight color, though the alpha value can take on any value between 0.0 and 1.0.

Modified thumbnail images are sent to the data sink 300. Alternatively, data for modifying a pre-existing thumbnail could be sent to the data sink 300 to modify thumbnails that are already present in the data sink 300.

Some specific exemplary operations are described below.

In a first example, a user is searching for recipes for pound cake. As a search request, the user enters the keywords "recipe" and "pound cake" and sends this request to the enhanced thumbnail generator 200 via the user input device 250. Based on the request, the controller 210 retrieves documents from the data source 100, via the browser 240 if necessary. It should be appreciated that the documents may be a collection of documents that are newly assembled in response to the request, such as in the case of Internet searching/retrieval, a pre-existing collection of documents stored in a local server, hard drive, floppy disk, or the like, or any combination or variation thereof.

Figure 3:
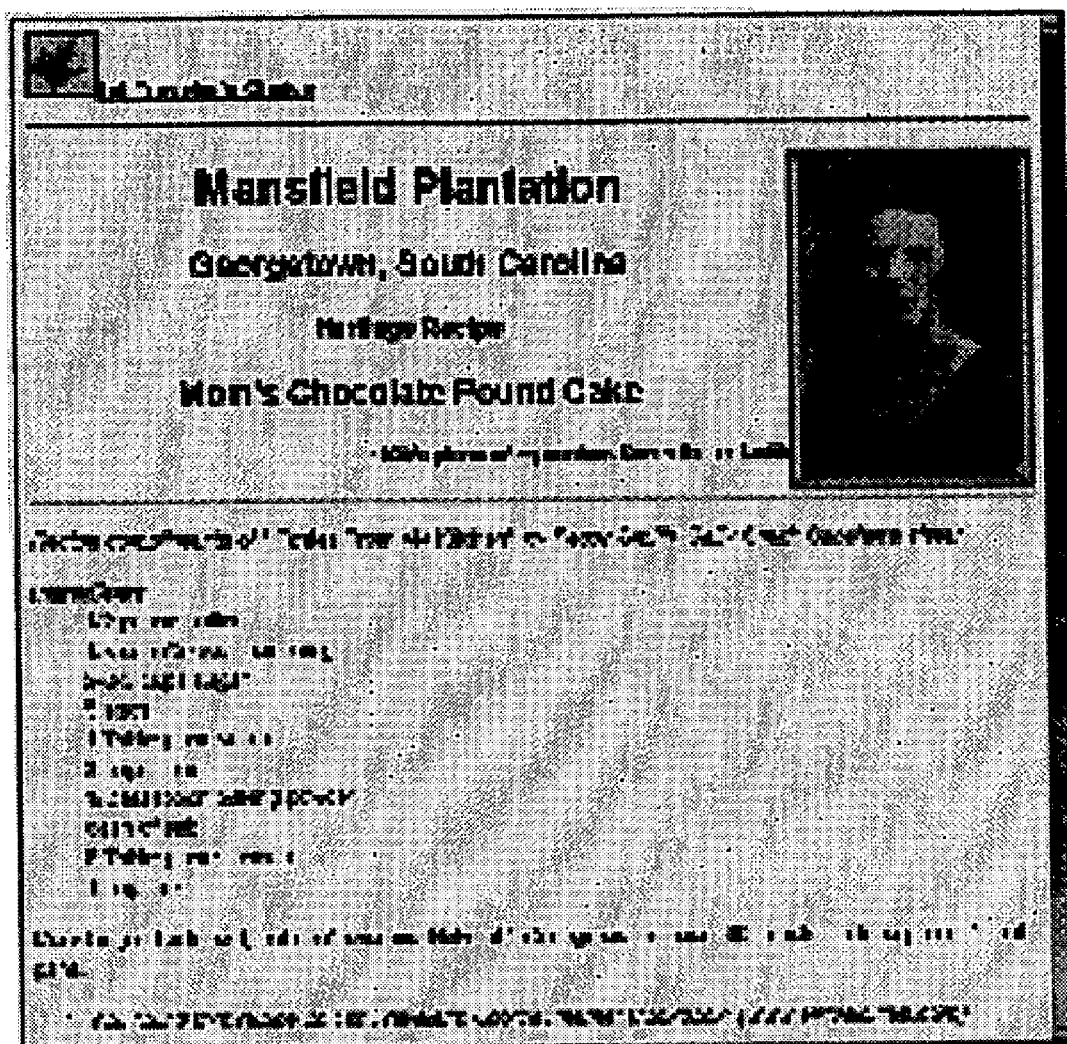
FIG. 3 shows a conventional thumbnail of a document.

After retrieving a document, for example, the conventional document represented in FIG. 3, the document format modifier 222 modifies the appearance of one or more elements. That is, the element extractor 2222 extracts important elements of the document, such as the header, and the location of the element is determined by the element location determiner 2226. In this example, the words of the header, i.e., "Mansfield Plantation Georgetown, South Carolina Heritage Recipe, Mom's Chocolate Pound Cake", are enlarged by the data modification system 2224 such that they are readable when rendered in a reduced-size representation. Additionally, the words of the documents that match the key words input by the user are highlighted. If desired, the user may specify the highlight color. For example, the user might specify that each instance of the words recipe and pound cake should be highlighted. These words may be highlighted in different colors if desired. Moreover, if desired, the size, color and/or font type may be modified differently depending on their relevance as determined by the relevance determination system 2228.

After such modification, the renderer 224 renders a reduced representation of the document.

If desired, the image modifier 226 may modify the reduced-size representation as described above. For example, as seen in FIG. 5, the specified words are expressed using callouts. That is, the specified words are enlarged, and optionally highlighted, and are overlaid on top of the thumbnail. The position in the document may be based on location information determined by the element location determiner 2226. If desired, the image modifier 226 may also adjust the position of callouts such that no callouts overlap each other.

If the image modifier 226 determines that not all of the callouts can fit in one thumbnail, the image modifier 226 may enlarge the thumbnail or reduce the number of callouts based on their relevance, as determined by the relevance determination system 2228. For example, the least relevant callouts may be omitted, duplicates may be omitted, or the like.

Sometimes the callout word or phrase exceeds the outside edge of the thumbnail, such as the phrase Pound Cake in FIG. 5. That is, the phrase Pound Cake, when enlarged as a callout, is too large to fit within the boundaries of the thumbnail. The system may support various "spill rules" that allows the callout to extend over the edge of the reduced page image so that no part of the callout phrase extending beyond the edge is cut, or specifying that the original thumbnail size be retained, cutting the extending callout part to be removed. The position of the callout might also be adjusted so that no part of the callout extends over the boundary of the thumbnail. The spill rules may be defined by the user or predefined in the enhanced thumbnail generator 200. The spill rules may include reducing size of the callout such that the width and/or height of the callout fits in the thumbnail image. Regardless of the position of the callouts, certain visual cues (e.g., those shown in FIGS. 19–20) may be used to indicate the spatial relationship between the location of the word in the original thumbnail and the position of the callout.

A thumbnail may, rather than being a static image, be animated to dynamically show content. For example, when mouse-over occurs, i.e., when a user positions an on-screen cursor over the thumbnail using a mouse or the like, the thumbnail may show important elements as flashing displays, scrolling displays, displays with continuously changing color, or the like. If there are more important elements in a document than can be shown in the thumbnail at one time, these important elements may be displayed in turn, randomly or in succession, for example.

Other examples of enhanced thumbnails applied to various documents are described using FIGS. 6–10. It should be appreciated that the thumbnails shown in FIGS. 6–10 are not to scale; they are shown larger than they would ordinarily appear on a display screen such as a computer monitor.

Figure 6:
FIG. 6 shows an enhanced thumbnail applied to an e-commerce genre exam pie.

FIG. 6 is an example of an enhanced thumbnail for an e-commerce document. In this example, the user may be able to locate a name of a product (i.e., MiniDisc Player in this example) to help the user identify the document without viewing the actual document.

Figure 7:
FIG. 7 shows an enhanced thumbnail applied to a news genre example.

FIG. 7 is an example of an enhanced thumbnail for a news document. The user can rapidly search information from a plurality of news articles by skimming the thumbnails containing enlarged words or phrases. In this case, the user may be able to specify the words and/or the color of the callouts that appear on the thumbnail.

Figure 8:
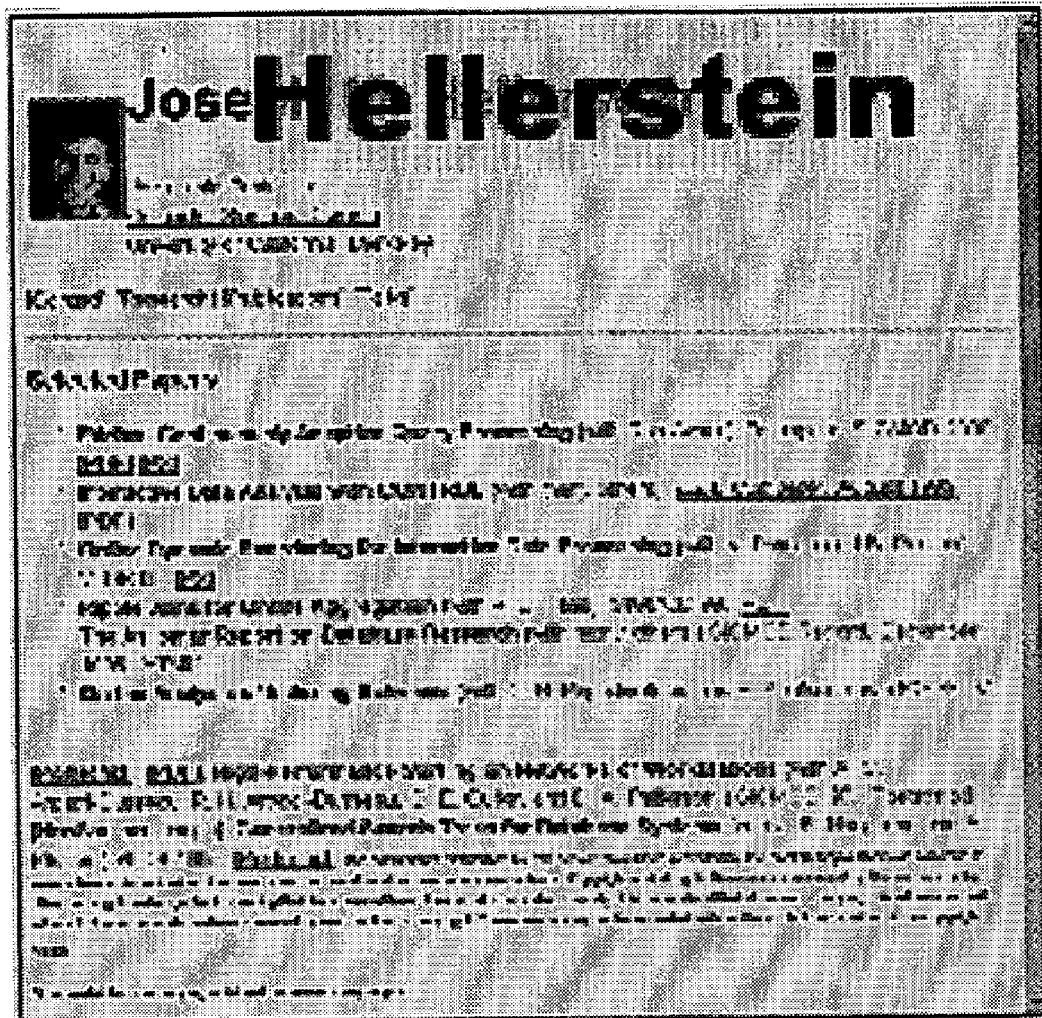
FIG. 8 shows an enhanced thumbnail applied to a home-page genre example.

FIG. 8 is an example of an enhanced thumbnail for a homepage. In this case, the name of the homepage owner is enlarged, and overlaid on the thumbnail as a highlighted callout.

Figure 9:
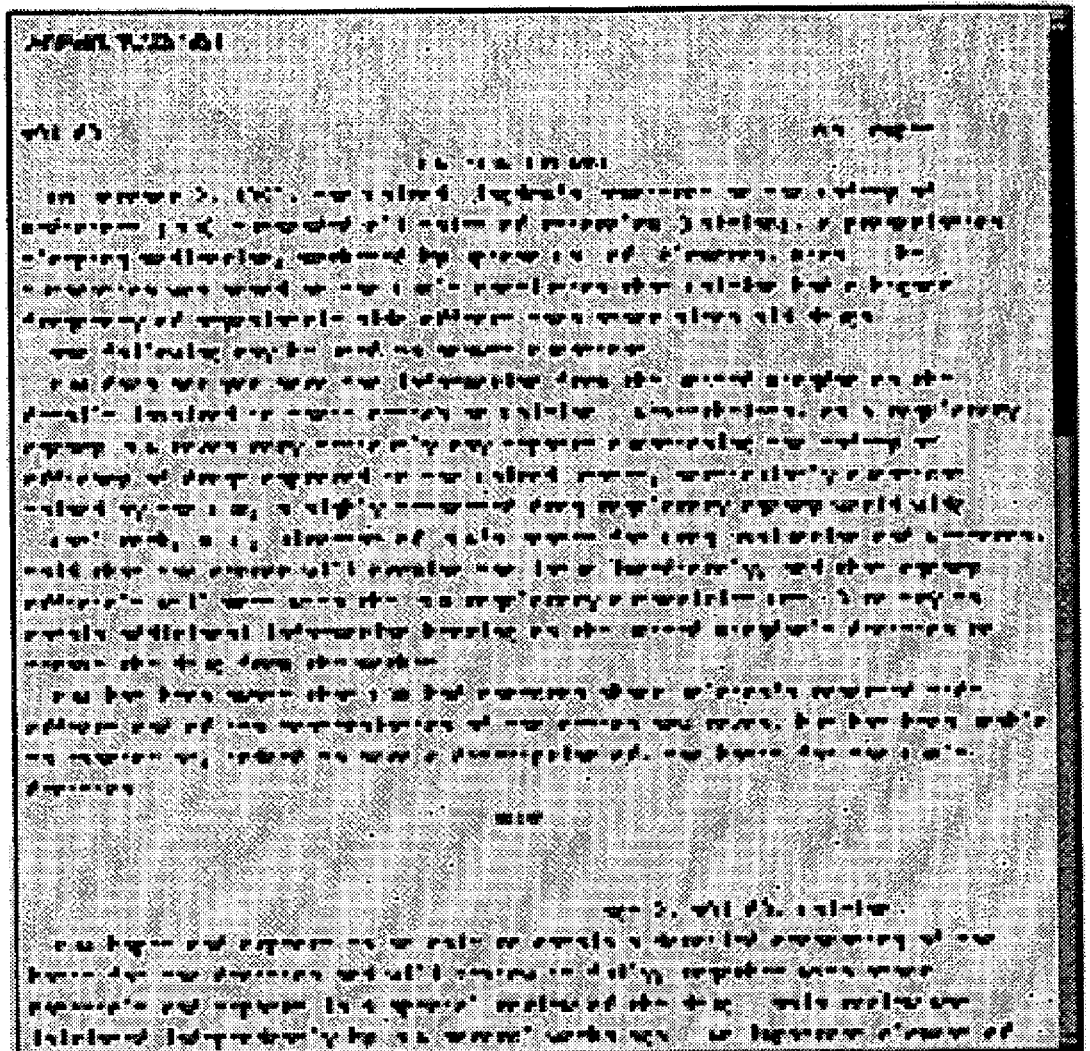
FIG. 9 shows a conventional thumbnail of a text page.
Figure 10:
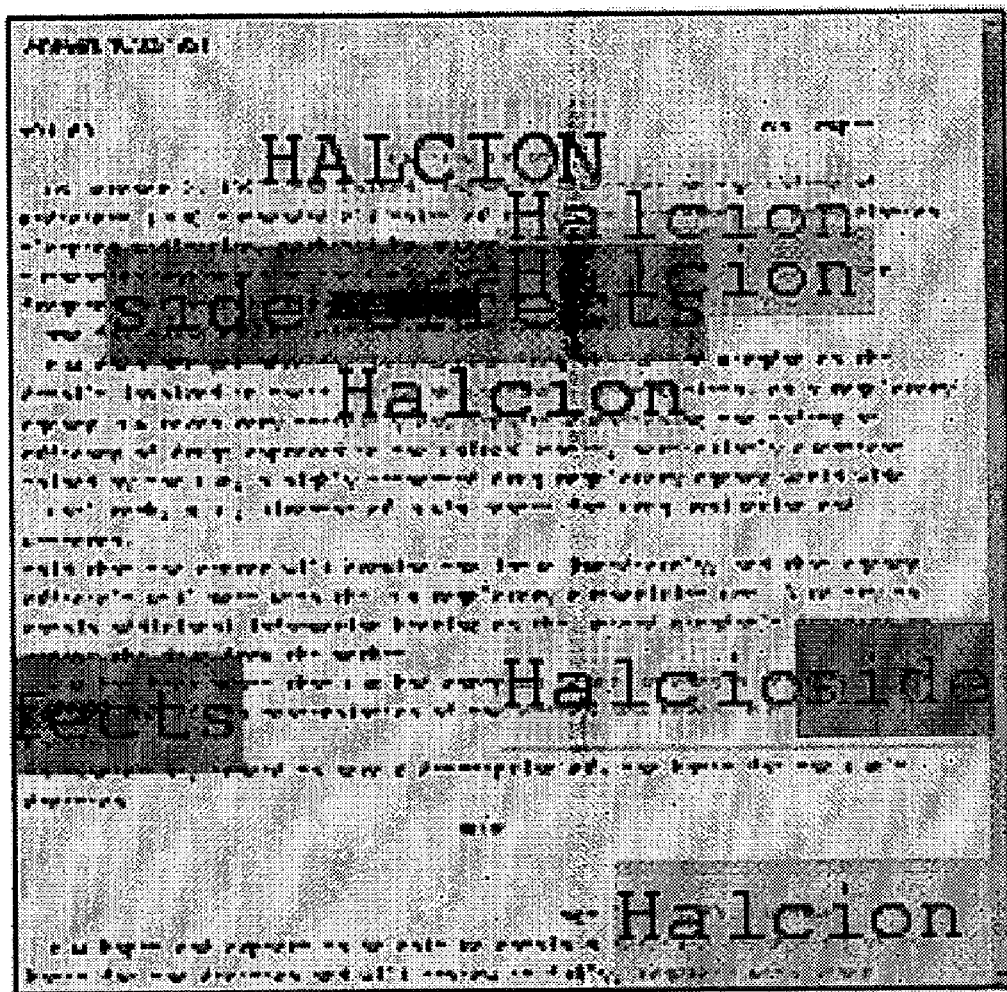
FIG. 10 shows an enhanced thumbnail of the text page shown in FIG. 9.

FIGS. 9 and 10 are examples of thumbnails for normal text documents. FIG. 9 shows a conventional thumbnail image which is created simply by reducing the size of the document. It can be appreciated that it is extremely hard to gain an idea of what kind of document this is. On the other hand, using an enhanced thumbnail, as shown in FIG. 10, since specified words are enlarged and colored, the user is able to grasp the content of the document more easily.

It should be appreciated that the reduced-size representation does not necessarily need to be modified by the image modifier 226. For example, if the modifications made by the data modification system 2224 are sufficient to allow easy readability of the important elements in the thumbnail, further modification by the image modifier 226 may be unnecessary. Thus, in embodiments, the image modifier 226 itself may be unnecessary. Conversely, modifications by the data modification system 2224 may not always be necessary, if the modifications made by the image modifier 226 are sufficient to allow easy readability, identification, or classification of the thumbnail. For example, when callouts are generated by the callout generator 2262, modifications by the data modification system 2224 may be unnecessary. Thus, in embodiments, the data modification system 2224 and/or the element location determiner 2226 may be unnecessary.

Figure 11:
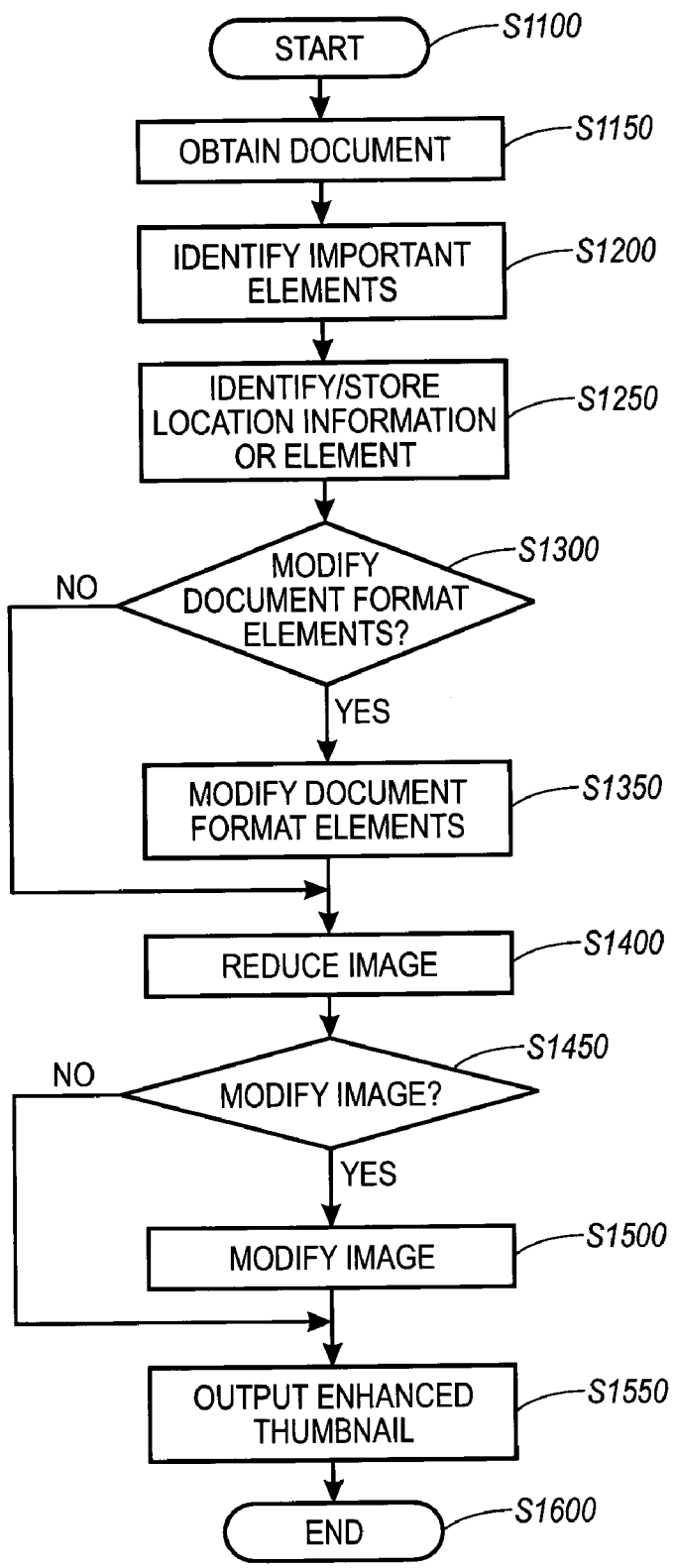
FIG. 11 is a flowchart illustrating an exemplary method for generating thumbnails.

FIG. 11 is a flowchart depicting one exemplary method of creating an enhanced thumbnail.

Beginning at step S1100, the process continues to step S1150 and obtains a document. The method then continues to step S1200. At step S1200, important elements of the document, such as the header, keywords, words or the like are identified, and the process then continues to step S1250. At step S1250, location information of one or more elements, which may or may not include the important elements identified in step S1200, is stored.

Next, in step S1300, it is determined whether one or more document format elements are to be modified. If document format elements are to be modified, the process moves to step S1350. Otherwise, the process jumps to step S1400.

At step S1350, the document format elements are modified, and the process continues to step S1400. At step S1400, a reduced-size representation of the document is created. Next, in step S1400, it is determined whether the reduced-size representation needs to be modified. If the reduced-size representation needs to be modified, the process continues to step S1500. Otherwise, the process jumps to step S1550.

At step S1500, one or more elements of the reduced-size representation are modified. For example, a callout may be applied on top of the thumbnail, and/or contrast and/or color of the image may be modified. Then, in step S1550, the enhanced thumbnail image is output, and the process then ends at step S1600.

In embodiments, one or more of the above-described steps may be omitted. For example, it may not be necessary to perform step S1250 if image modification is not to be performed, or if the image modification to be performed does not rely on element position information. If only image modification, such a callout or the like, is to be performed and no document format modifications are necessary, steps S1300 and S1350 may be omitted. Likewise, if only document format modifications are to be performed, steps S1450 and S1500 may be omitted.

Experiments have shown that the time that is required for a user to review a collection of documents is reduced by at least 20% with the enhanced thumbnail images, compared to reviewing conventional results from search engines.

Figure 12:
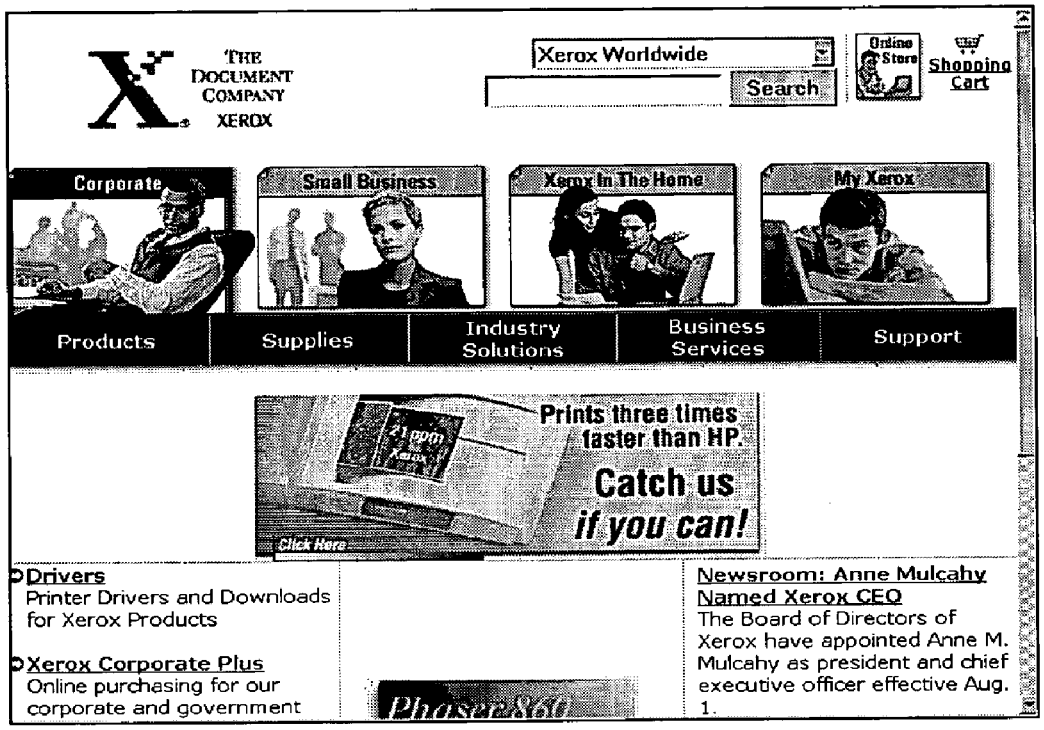
FIG. 12 is an example of conventional original document.
Figure 13:
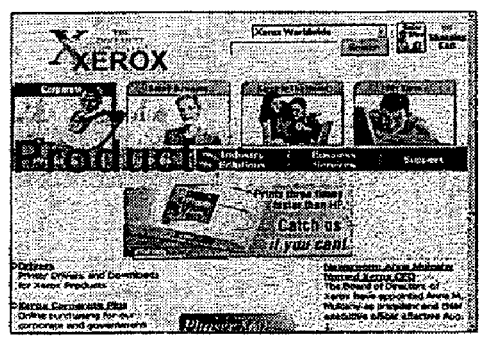
FIG. 13 is an example of a thumbnail associated with the document shown in FIG. 12.
Figure 14:
FIG. 14 is an example of a document version generated based on the thumbnail image shown in FIG. 13.

To obtain even further benefit from enhanced thumbnail image, the enhancements, i.e., the data and/or image modifications presented in the thumbnail image, may be retained when a document associated with the thumbnail image is displayed. FIGS. 12–14 show an example. That is, FIG. 12 shows an original document. FIG. 13 shows an enhanced thumbnail that has been created based on the document. FIG. 14 shows a document version that is displayed when a user requests display of a document associated with the thumbnail by, for example, mouse-clicking the thumbnail.

When the enhanced thumbnail shown in FIG. 13 is created, the words "Xerox" and Products are designated as important elements and are therefore enlarged to gain the user's attention. When a user requests display of a document associated with the thumbnail by, for example, mouse-clicking on the thumbnail, the enhancement retention system 270 temporarily or permanently displays a document with modifications corresponding to all or some of the modified elements of the thumbnail image. Specifically, in this example, as shown in FIG. 14, the displayed document version, like the thumbnail, has the words "Xerox" and "Products" enlarged.

In this example, an advantage of going from the thumbnail shown in FIG. 13 to the document version shown in FIG. 14 is that the user can more easily identify relevant portions of a document, and avoid becoming disoriented in the transition from the thumbnail to the document, because the same elements that attracted the user's attention in the thumbnail image will attract the user's attention in the document associated with the image. If desired, the enhancement retention system 270 may display the document in its original format, i.e., without the enhancements, when requested by the user (e.g., by clicking a specified button on a mouse, by selecting a specified selectable element on a display screen, or the like) or after a predetermined period of time has elapsed, for example.

This invention may also apply to thumbnails which are not modified with enhancements as described above, but which otherwise have one or more appearance characteristics that are different from the original document. In other words, the different appearance characteristics of the thumbnail may be retained, either permanently or temporarily, when displaying a document associated with the thumbnail image. Thus, the above-described enhancement retention may apply to documents associated with thumbnails generated using any known or later developed methods, including but not limited to the above-described methods.

Figure 15:
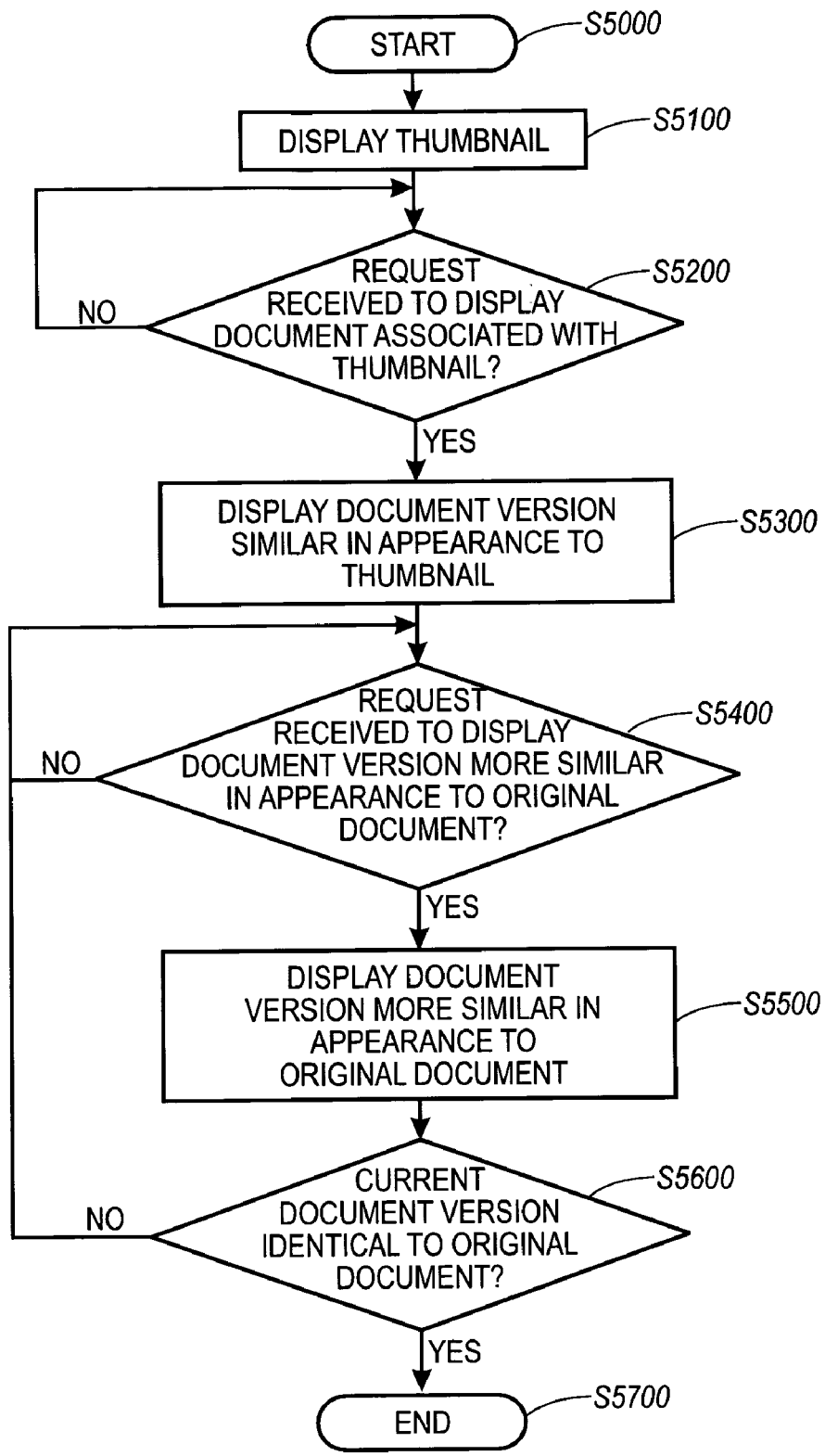
FIG. 15 is a flowchart illustrating a first exemplary method for displaying a document.

FIG. 15 is a flowchart depicting a first exemplary method of enhancement retention. The process starts at step S5000 and continues to step S5100, where a thumbnail is displayed. In step S5200, it is determined whether a request has been received to display a document associated with the thumbnail. If a request has been received, the process continues to step S5300. Otherwise, step S5200 is repeated until a request has been received.

In step S5300, a document version more similar in appearance to the thumbnail than the original document is displayed. The process then continues to step S5400. In step S5400, it is determined whether a request has been received to display another document version more similar in appearance to the original document than the thumbnail image. If the request has been received, the process continues to step S5500. Otherwise, the process repeats step S5400. It can be appreciated that if a request is never received in step S5400, the process effectively ends at step S5400.

In step S5500, a document version is displayed that is more similar in appearance to the original document than the previously displayed version. It should be appreciated that the transition from the previously displayed version to the currently displayed version may involve an animation or morphing from one version to the other, or any of a number of known visual effects. It should also be appreciated that the document version that is more similar to the original document may actually be identical to the original document. The process then continues to step S5600, where it is determined whether the currently displayed document version is identical to the original document. If the current version is not identical, the process returns to step S5400 and repeats steps S5400–S5600. If the current version is identical to the original document, the process continues to step S5700 and ends.

Figure 16:
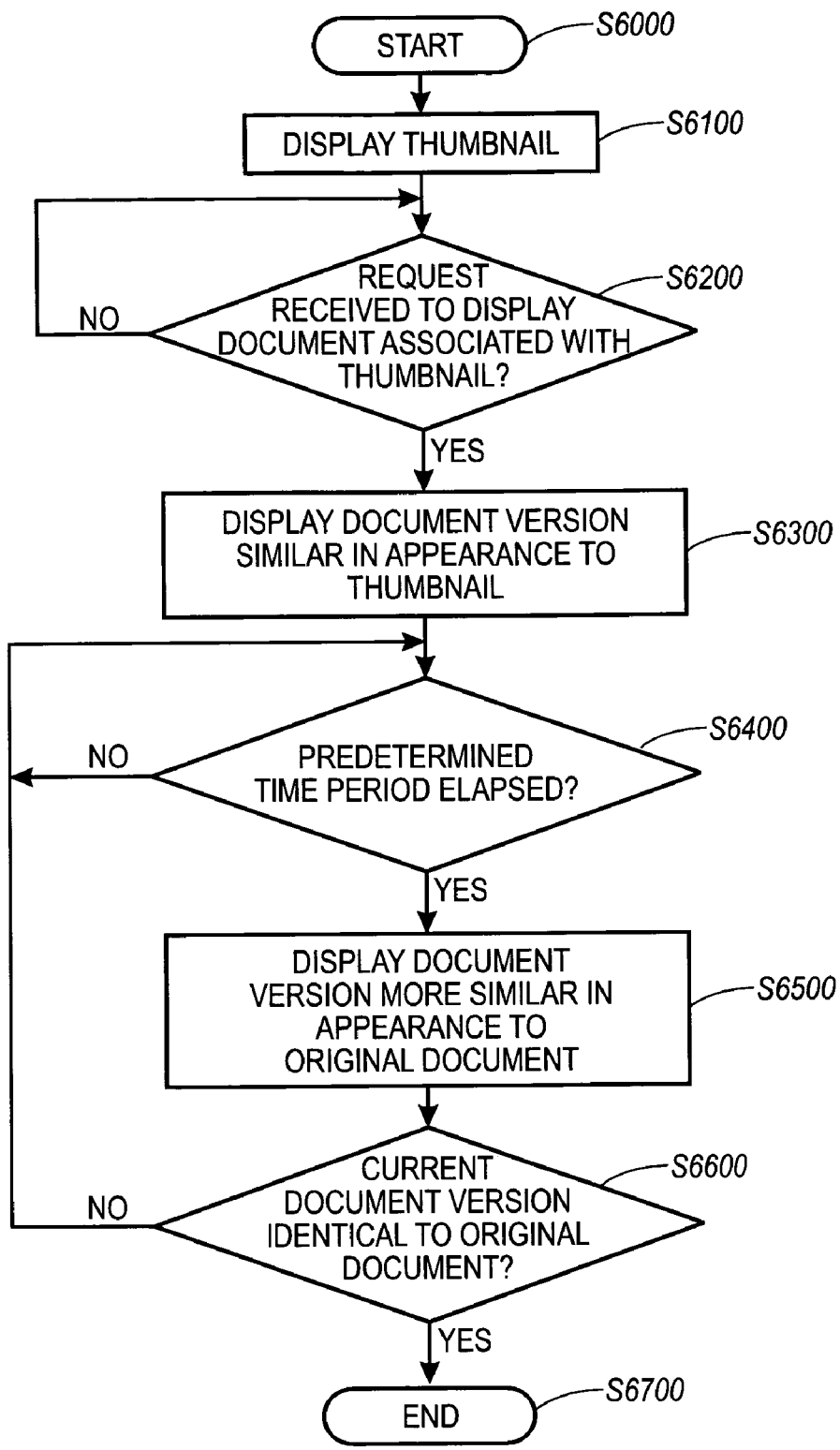
FIG. 16 is flowchart illustrating a second exemplary method for displaying a document.

FIG. 16 is a flowchart depicting a second exemplary method of enhancement retention. In this flowchart, steps S6000–S6300 and S6500–S6700 are the same as steps S5000–S5300 and S5500–S5600 of the flowchart shown in FIG. 15. Thus, descriptions of these steps are omitted.

In step S6400, it is determined whether a predetermined time period has elapsed. If the predetermined time period has elapsed, the process moves to step S6500, otherwise the process repeats step S6400. Thus, rather than requiring a user request to display a document version more similar, or identical, to the original document, the identical or more-similar document is automatically displayed after a predetermined time period such as two second, five seconds, or any other suitable time period. The predetermined time period is preferably just long enough to allow the user to visually locate the important elements in the document. An unnecessarily long period may impede the user's access to document details surrounding the important element(s).

Figure 17:
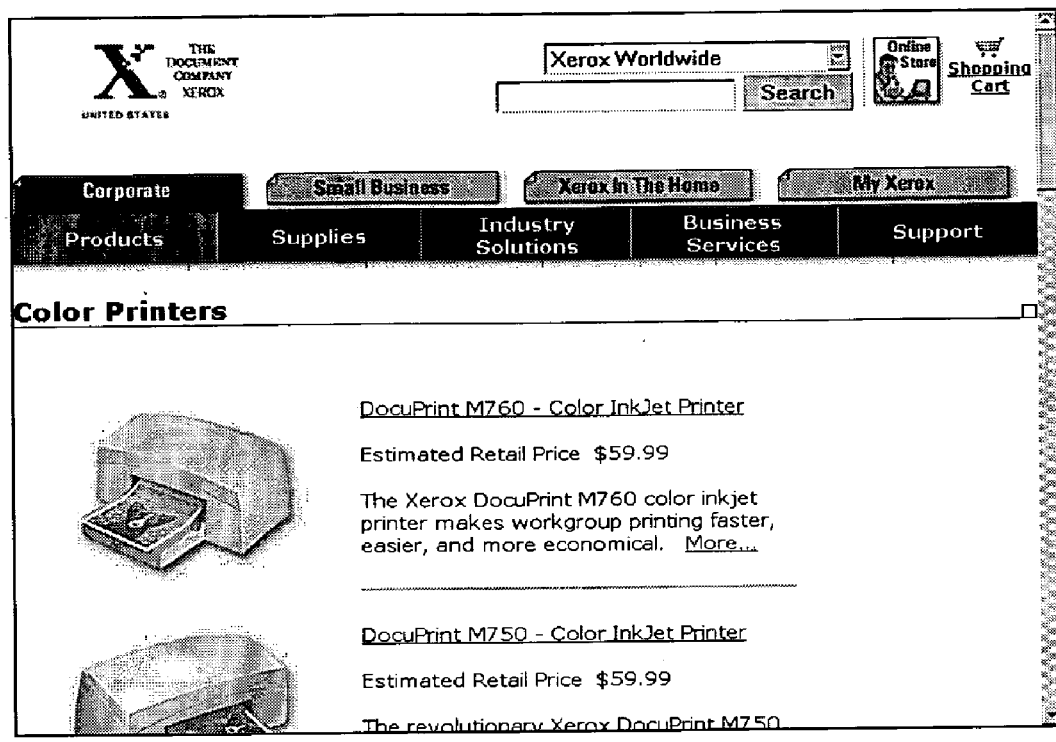
FIG. 17 is conventional example of a document displayed using a click-through procedure.

FIGS. 12, 13 and 17 illustrate an example of a click-through procedure that may be implemented using the click-through system 280 of FIG. 1. The click-through procedure allows a user quicker access to desired content. To implement the click-through procedure, a thumbnail with one or more selectable elements is generated using the selectable element generator 2268 of FIG. 2. For example, the thumbnail of FIG. 13 is generated based on the original document of FIG. 12. In this example, the word "products" in the original document of FIG. 12 is a selectable element which, when selected by mouse-clicking or the like, causes another document, shown in FIG. 17, to be displayed.

To enable the click-through procedure, when the thumbnail of FIG. 13 is generated, the word "products" in the thumbnail is also displayed as a selectable element. In FIG. 13, the selectable element "products" is enlarged relative to other elements in the thumbnail, in order to be more visible. However, it should be appreciated that a selectable element in a thumbnail does not necessarily need to be enlarged relative to surrounding elements, provided that it is visually distinguishable as selectable element and/or large enough for a user to select by, for example, mouse-clicking.

When the user selects the selectable element "products" in FIG. 13, the display jumps to the conventional document shown in FIG. 17. Thus, the user may directly access the content of the document shown in FIG. 17, just as if he or she had selected the corresponding selectable element of the document shown in FIG. 12. The difference is that the step of first displaying the original document has been eliminated. If the user wishes to view the original document, rather than jumping directly to another document, the user may do so by clicking a portion of the thumbnail other than a selectable element, or by making another user interface gesture, such as clicking while pressing a specified mouse button anywhere on the thumbnail, including on a selectable element.

The click-through procedure may also be applied using a thumbnail generated based on an original document without selectable elements. In this case, the thumbnail may be provided with selectable elements which, rather than corresponding to selectable elements of the original document, correspond to different areas of the document. As discussed above, the selectable elements need not be visibly discrete elements, but may simply be different areas of the thumbnail. For example, selecting near the top of the thumbnail by mouse-clicking or the like would cause the first page of the document to be displayed, etc. However, a direct positional correlation between the selectable elements and the corresponding areas of the document is not required. For example, if the original document is a four-page document, the thumbnail may be provided with four selectable elements, each corresponding to a different page. The thumbnail may be partitioned into an upper left section, an upper right section, a lower left section and a lower right section. When a user mouse-clicks the upper left section, the first page may be displayed; mouse-clicking the upper right section may result in the second page being displayed; and so forth.

Figure 18:
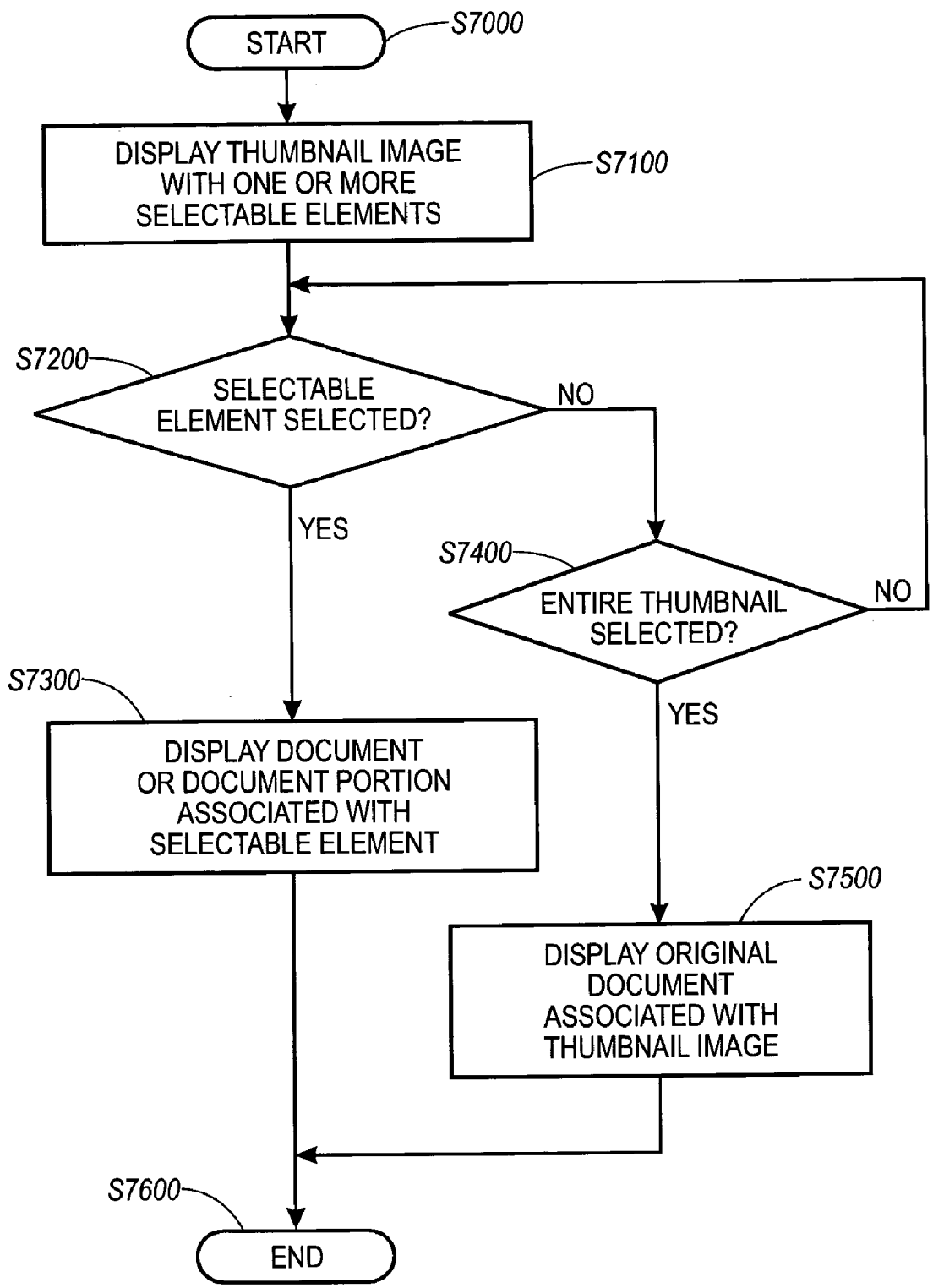
FIG. 18 is a flowchart illustrating an exemplary method for implementing a click-through display procedure.

FIG. 18 is a flowchart depicting an exemplary method of enabling a click-through procedure. The process starts at step S7000 and continues to step S7100, where a thumbnail image with one or more selectable elements is displayed. The process then continues to step S7200. In step S7200, it is determined whether a selectable element on the thumbnail has been selected. If a selectable element has been selected, the process continues to step S7300. Otherwise, the process jumps to step S7400.

In step S7300, a document or document portion associated with the selected selectable element is displayed, and the process jumps to step S7600.

In step S7400, it is determined whether the entire thumbnail image has been selected. If the entire thumbnail image has been selected, the process continues to step S7500. Otherwise, the process returns to step S7200.

In step S7500, an original document associated with the thumbnail image is displayed, and the process then ends in step S7600.

FIGS. 19–31 show additional examples of enhancements that may be provided on enhanced thumbnails. These enhancements may be performed by the document format modifier 222 and/or the image modifier 226.

Figure 19:
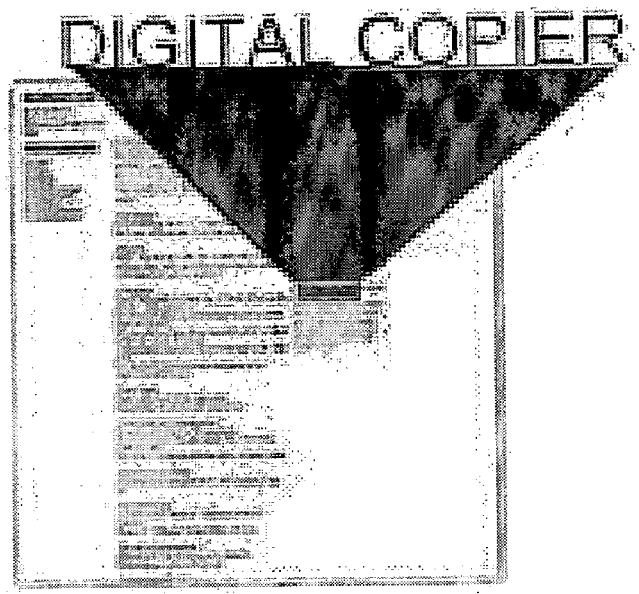
FIGS. 19–31 each show a different example of a thumbnail enhancement.

FIG. 19 shows that a modified element, e.g., the phrase DIGITAL COPIER, appears to zoom from the thumbnail. The direction of the zoom may be specified by the user or may be predetermined by the system. The color of the zoom may be specified by the user or may be changed based on the relevance of the element.

Figure 20:
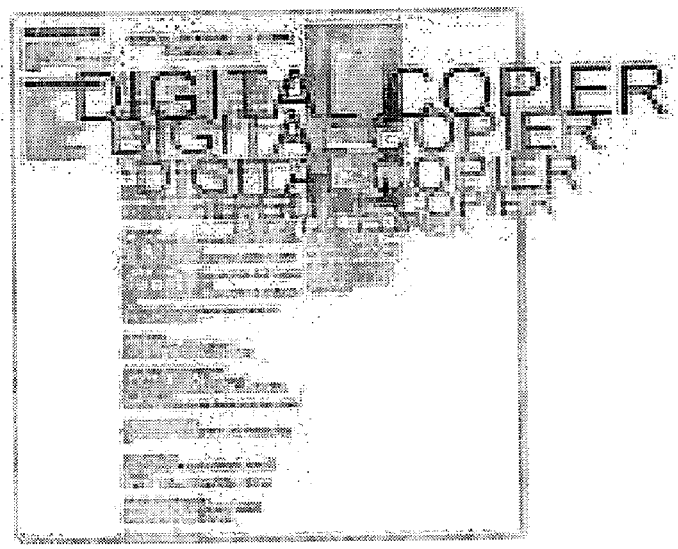

FIG. 20 shows another type of zoom effect. In this case, the phrase DIGITAL COPIER appears multiple times, with each successive appearance of the phrase offset from the previous appearance and having a different size.

Figure 21:
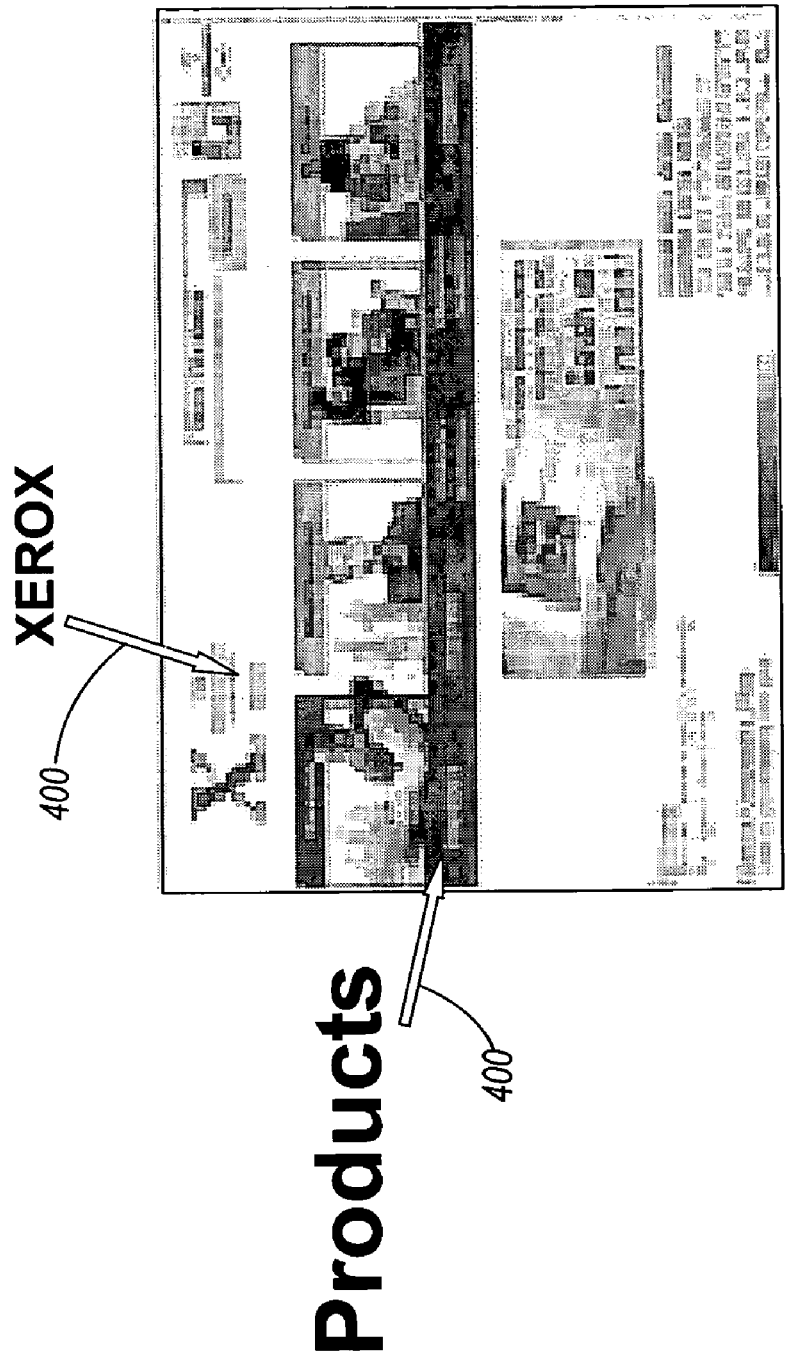

FIG. 21 shows a thumbnail having callouts "Xerox" and "Products" located outside of the thumbnail image, with arrows 400 connecting the callouts and the location of the corresponding elements in the thumbnail. This effect allows the user to view the thumbnail and callouts without the callouts obscuring significant portions of the thumbnail background.

Figure 22:
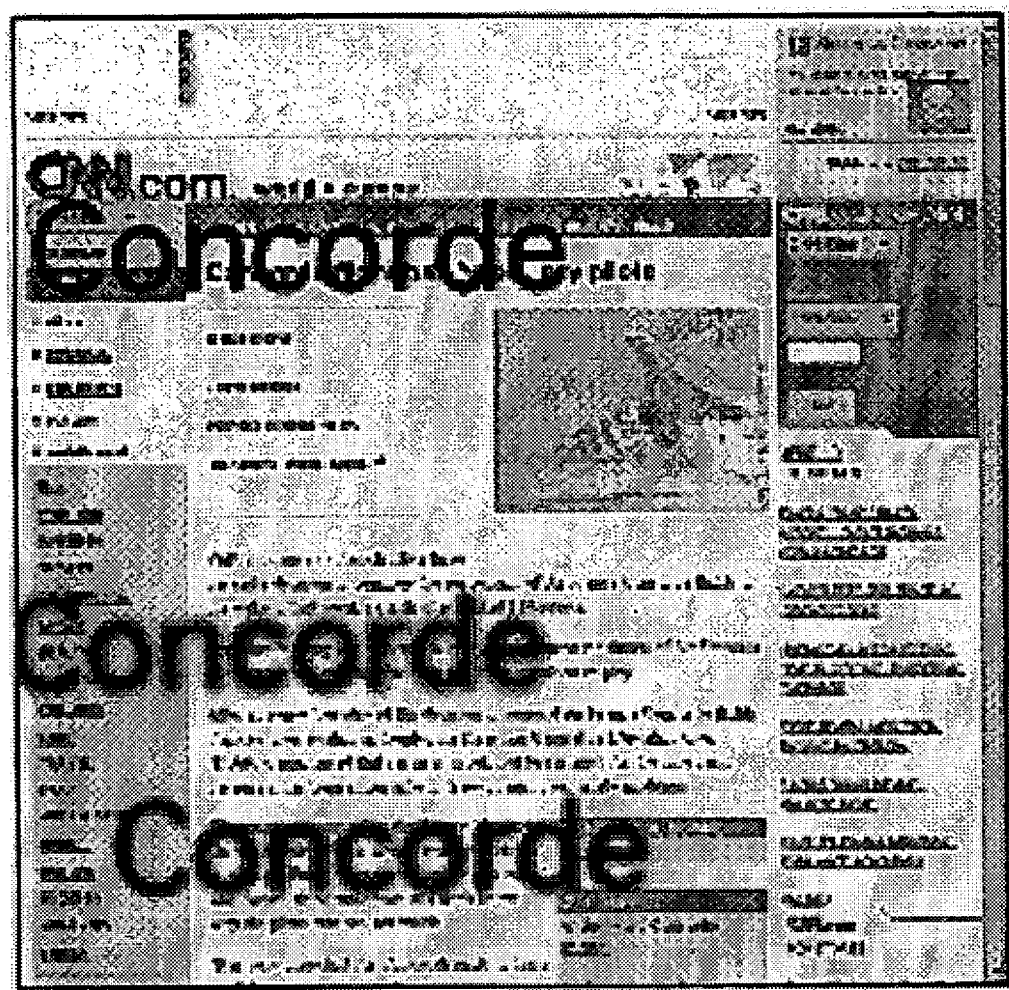
Figure 23:
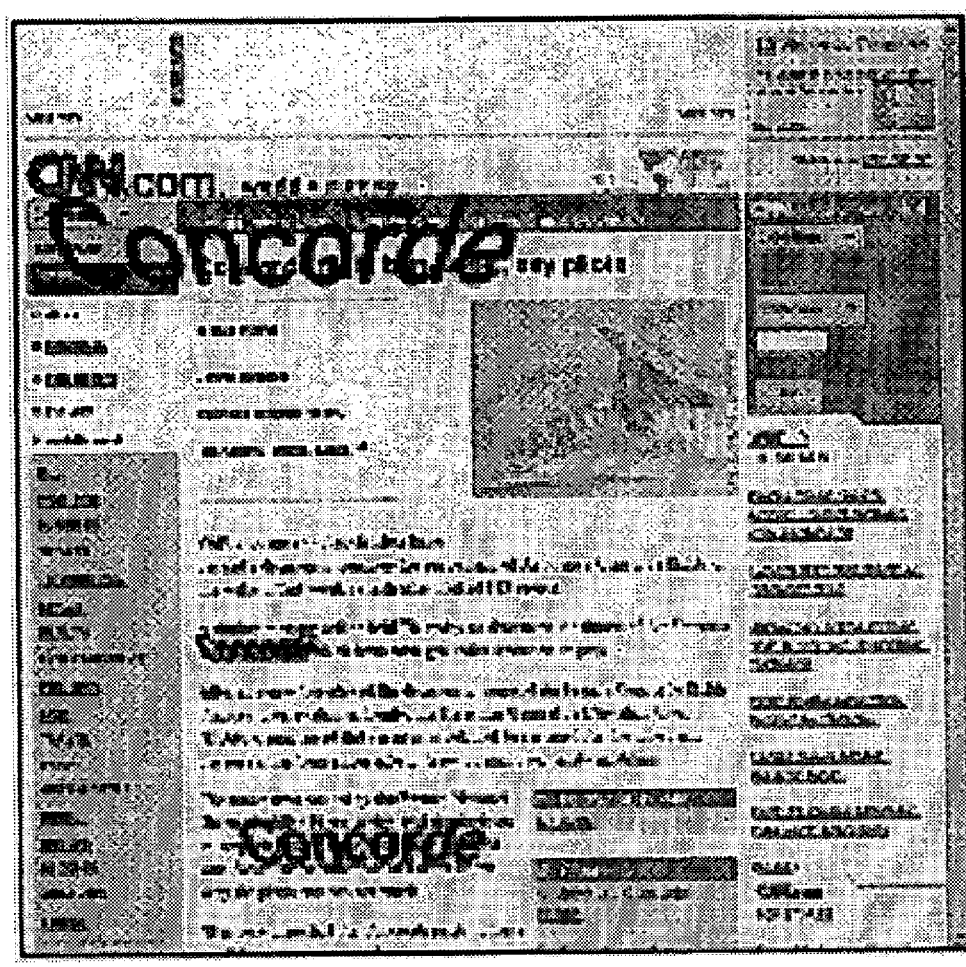

FIGS. 22 and 23 show different image transformations of text. FIG. 22 shows a transformation in which blurry text is generated for the word "Concorde". FIG. 22 shows a transformation in which perspective text is generated for the word "Concorde".

Figure 24:

FIG. 24 shows a thumbnail on which a callout has been overlaid that occupies substantially the entire thumbnail. FIG. 25 shows a thumbnail in which important elements are indicated by arrows 500.

Figure 26:
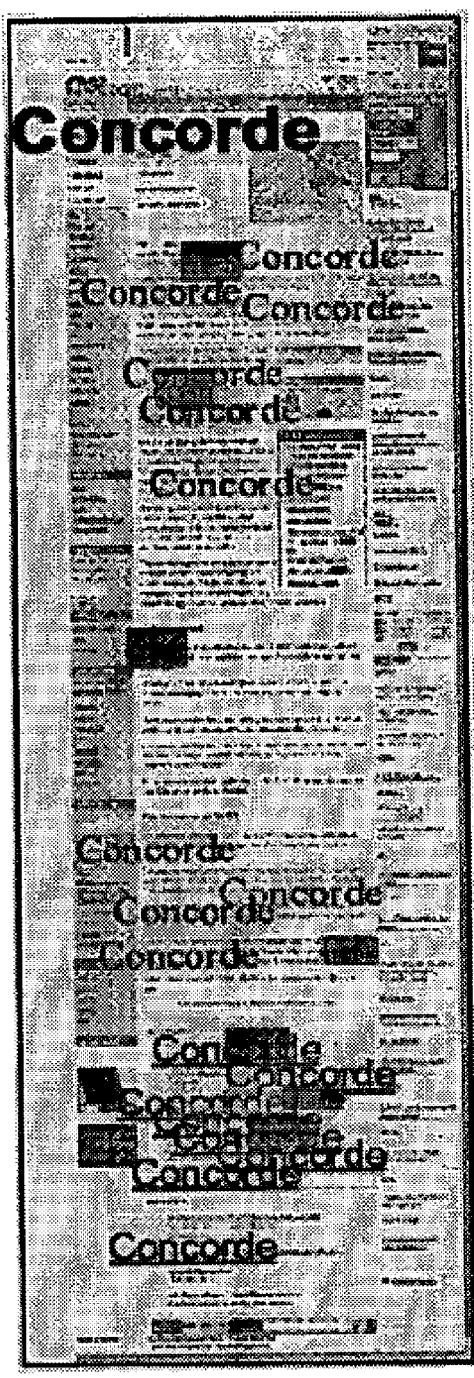
Figure 27:
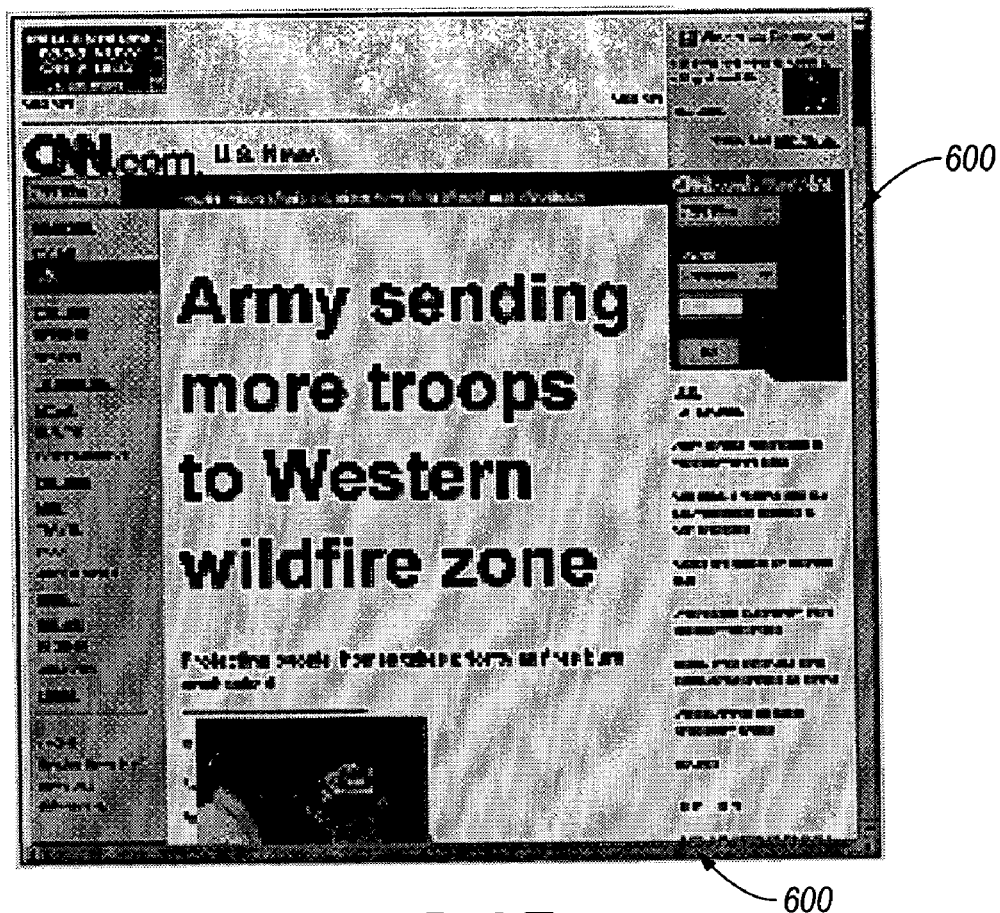

FIGS. 26 and 27 show examples of enhanced thumbnails that are particularly useful in cases in which the original document may be rather long and/or wide. For example, many web pages are often lengthy in one direction, e.g. in the vertical direction. In that case, as shown in FIG. 26, the renderer 224 may generate a reduced representation of the entire document, and enhancements may be applied as described above. The thumbnail shown in FIG. 27 has scroll bars 600 which a user may operate in known fashion, and which allow the user to scroll to different parts of the thumbnail corresponding to different parts of the original document associated with the thumbnail, and which additionally indicate how much of the entire document is being displayed in the thumbnail.

FIGS. 28–31 illustrate how callouts may be changed depending on the size of the thumbnail image. FIGS. 28–31 show thumbnails of successively decreasing sizes. These figures may illustrate different sizes of thumbnail that may be generated by the enhanced thumbnail generator 220, or may illustrate a variable size thumbnail that may be enlarged or reduced by a user. For example, the user may change the size of a thumbnail from the size shown in FIG. 28 to the size shown in FIG. 29, then to the size shown in FIG. 30, and finally to the size shown in FIG. 31.

Figure 28:
Figure 29:

In FIG. 28, the words "Antz", "movie" and "poster" are displayed as modified elements. In FIG. 29, the same words are displayed, but the word "poster" is not as large as in FIG. 28. This may be, for example, because the word "poster" has been determined to be less relevant than the other words, and/or because it will not fit within the boundaries of the thumbnail unless thus reduced.

Figure 30:
Figure 31:
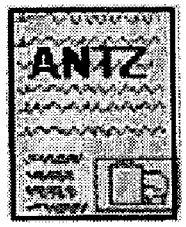

In FIG. 30, the words "poster" is no longer displayed as a callout, and the other callouts are somewhat reduced in size so that they will fit on the thumbnail. In FIG. 31, only the words "Antz" remains as a callout.

This invention is not limited to the above described methods and apparatus. One of ordinary skill in the art would understand that many different modifications are possible without departing from the scope of the invention.

For example, in the examples described above, callouts are positioned directly above the word with which they are associated in the thumbnail. However, it may be desirable to slightly adjust the position of the callouts so as to minimize their occlusion of each other or of other useful information on the thumbnail such as readable headers. Another alternative is to include the text in only one callout per thumbnail and render the other callouts as colored bands only, giving the user a sense of the distribution of the word in the page without cluttering it with text. For example, if the words "recipe" and "pound cake" are used as keywords, as in one of the above-described examples, a yellow-highlighted callout with the text "recipe" may be rendered corresponding to one of the occurrences of the word "recipe" in the document, and callouts including yellow bands only may be overlaid on other occurrences of the word "recipe". Similarly, one red-highlighted callout with the text "pound cake" may be rendered for one occurrence of the phrase "pound cake", and callouts including red bands only may be rendered for other occurrences of the phrase "pound cake". If necessary, the callouts without text may be smaller, so as to cover less of, and add less clutter to, the thumbnail.

Additionally, those skilled in the art will recognize many applications for the present invention, including but not limited to display devices such as file browser devices, email browsers, hierarchy browsers, systems that display thumbnails of applications of a personal computer, handheld devices, and the like. In short, the invention has application to any known or later developed system or device capable of using plain thumbnails.

What is claimed is:

1. A method of displaying a document, comprising:
    displaying a thumbnail having at least one first selectable element and a second, seperate selectable portion, the second portion of the thumbnail being selectable and having an original document as a first associated destination, and the at least one first selectable element having, as a second associated destination, one of (a) a portion of the original document, smaller than the original document as a whole and (b) a document other than the original document;
    receiving a selection of one of (a) the second portion of the thumbnail and (b) the at least one first selectable element; and
    accessing one of the first associated destination and the second associated destination, based on the selection,
    wherein the thumbnail is a reduced-size representation of at least a part of the original document.

2. The method according to claim 1, wherein the portion of the original document is a document portion not uniquely associated with any selectable element provided in the original document.

3. The method according to claim 1, wherein the portion of the original document is another portion of the original document accessible by selection of a second selectable element provided in the original document the another portion corresponding to a position different from the second selectable element.

4. A method of displaying a document, comprising:
    displaying a thumbnail associated with an original document and having at least one first selectable element, each at least one first selectable element having, as an associated destination, one of (a) another portion of the original document accessible by selection of a second selectable element provided in the original document and (b) a document other than the original document accessible by selection of a second selectable element provided in the original document, the another portion corresponding to a position different from the second selectable element;
    receiving a selection of one of the at least one first selectable element; and
    directly accessing the associated destination based on the selection without first accessing the original document,
    wherein the thumbnail is a reduced-size representation of at least a part of the original document.

5. The method according to claim 4, wherein the thumbnail is an enhanced thumbnail having at least one element with a modified appearance relative to an appearance of a corresponding element in the original document.

6. The method according to claim 5, wherein the at least one element with a modified appearance is the at least one first selectable element.

7. The method according to claim 4, wherein the document other than the original document is accessible by selection of a third selectable element provided in the original document.

8. The method according to claim 4, wherein the at least one first selectable element is a visibly discrete element.

9. A system for displaying a document, comprising:
    a display device; and
    a controller that:
        displays a thumbnail having at least one first selectable element and a second, separate selectable portion, the second portion of the thumbnail being selectable and having an original document as a first associated destination, and the at least one first selectable element having, as a second associated destination, one of (a) a portion of the original document, smaller than the original document as a whole and (b) a document other than the original document;
        receives a selection of one of (a) the second portion of the thumbnail and (b) the at least one first selectable element; and
        accesses one of the first associated destination and the second associated destination, based on the selection,
    wherein the thumbnail is a reduced-size representation of at least a part of the original document.

10. The system according to claim 9, wherein the portion of the original document is a document portion not uniquely associated with any selectable element provided in the original document.

11. The system according to claim 9, wherein the portion of the original document is another portion of the original document accessible by selection of a second selectable element provided in the original document, the another portion corresponding to a position different from the second selectable element.

12. A system for displaying a document, comprising:
    a display device; and
    a controller that:
        displays a thumbnail associated with an original document and having at least one first selectable element, each at least one first selectable element having, as an associated destination, one of (a) another portion of the original document accessible by selection of a second selectable element provided in the original document and (b) a document other than the original document accessible by selection of a second selectable element provided in the original document, the another portion corresponding to a position different from the second selectable element;

receives a selection of one of the at least one first selectable element; and directly accesses the associated destination based on the selection without first accessing the original document, wherein the thumbnail is a reduced-size representation of at least a part of the original document.

13. The system according to claim 12, wherein the thumbnail is an enhanced thumbnail having at least one element with a modified appearance relative to an appearance of a corresponding element in the original document.

14. The system according to claim 13, wherein the at least one element with a modified appearance is the at least one first selectable element.

15. The system according to claim 12, wherein the document other than the original document is accessible by selection of a third selectable element provided in the original document.

16. The system according to claim 12, wherein the at least one first selectable element is a visibly discrete element.

17. An information storage medium on which recorded a program, the program comprising:

an instruction for displaying a thumbnail having at least one first selectable element and a second, separate selectable portion, the second portion of the thumbnail being selectable and having an original document as a first associated destination, and the at least one first selectable element having, as a second associated destination, one of (a) a portion of the original document, smaller than the original document as a whole and (b) a document other than the original document;

an instruction for receiving a selection of one (a) the second portion of the thumbnail and (b) the at least one first selectable element; and an instruction for accessing one of the first associated destination and the second associated destination, based on the selection, wherein the thumbnail is a reduced-size representation of at least a part of the original document.

18. An information storage medium on which recorded a program, the program comprising:

an instruction for displaying a thumbnail associated with an original document and having at least one first selectable element, each at least one first selectable element having, as an associated destination, one of (a) another portion of the original document accessible by selection of a second selectable element provided in the original document and (b) a document other than the original document accessible by selection of a second selectable element provided in the original document, the another portion corresponding to a position different from the second selectable element;

an instruction for receiving a selection of one of the at least one first selectable element; and an instruction for directly accessing the associated destination based on the selection without first accessing the original document, wherein the thumbnail is a reduced-size representation of at least a part of the original document.

* * * * *